(12) United States Patent
Ikeda et al.

(10) Patent No.: US 9,715,636 B2
(45) Date of Patent: Jul. 25, 2017

(54) IMAGE PROCESSING APPARATUS AND IMAGE PROCESSING METHOD

(71) Applicant: CANON KABUSHIKI KAISHA, Tokyo (JP)

(72) Inventors: Tohru Ikeda, Yokohama (JP); Shinjiro Hori, Yokohama (JP); Yumi Yanai, Yokohama (JP); Tetsuya Suwa, Yokohama (JP); Hidetsugu Kagawa, Kawasaki (JP); Tomokazu Ishikawa, Yokohama (JP); Wakako Tanaka, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/191,210

(22) Filed: Jun. 23, 2016

(65) Prior Publication Data

US 2017/0004375 A1    Jan. 5, 2017

(30) Foreign Application Priority Data

Jul. 1, 2015  (JP) .................................. 2015-132828

(51) Int. Cl.
| | | |
|---|---|---|
| *G06K 9/46* | (2006.01) | |
| *G06K 9/38* | (2006.01) | |
| *H04N 1/00* | (2006.01) | |

(52) U.S. Cl.
CPC .................. *G06K 9/46* (2013.01); *G06K 9/38* (2013.01); *H04N 1/00795* (2013.01); *H04N 2201/0094* (2013.01)

(58) Field of Classification Search
CPC ....................................................... G06K 9/46
See application file for complete search history.

(56) References Cited

U.S. PATENT DOCUMENTS

| | | | | |
|---|---|---|---|---|
| 5,394,250 | A | * | 2/1995 | Shono .................. H04N 1/4053 358/3.03 |
| 8,503,031 | B2 | | 8/2013 | Kajihara |
| 8,619,319 | B2 | | 12/2013 | Tsuchiya |
| 8,830,530 | B2 | | 9/2014 | Sano |

(Continued)

FOREIGN PATENT DOCUMENTS

JP    2013-185862    9/2013

OTHER PUBLICATIONS

U.S. Appl. No. 15/191,226, filed Jun. 23, 2016.

(Continued)

*Primary Examiner* — Ibrahim Siddo
(74) *Attorney, Agent, or Firm* — Fitzpatrick, Cella, Harper & Scinto

(57) ABSTRACT

By setting a parameter in accordance with features of a unique portion appearing in a print image, the unique portion in the print image is efficiently determined. The image is printed on a sheet along with a relative movement in a main scanning direction of the sheet and a print head on which multiple printing elements are arrayed in a sub-scanning direction. One division area is set such that a size in the main scanning direction is greater than a size in the sub-scanning direction. A shift amount from one division area to another division area is set such that a shift amount in the main scanning direction greater than a shift amount in the sub-scanning direction.

9 Claims, 20 Drawing Sheets

(56) References Cited

U.S. PATENT DOCUMENTS

| | | |
|---|---|---|
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 2003/0133606 A1 | 7/2003 | Yano |
| 2009/0207453 A1* | 8/2009 | Ike ............... H04N 1/40087 358/3.22 |
| 2016/0167414 A1 | 6/2016 | Yanai |
| 2016/0167415 A1 | 6/2016 | Ikeda |
| 2016/0173725 A1 | 6/2016 | Kato |

OTHER PUBLICATIONS

U.S. Appl. No. 14/991,618, filed Jan. 8, 2016.
U.S. Appl. No. 15/192,216, filed Jun. 24, 2016.
U.S. Appl. No. 15/192,229, filed Jun. 24, 2016.
U.S. Appl. No. 15/192,243, filed Jun. 24, 2016.
U.S. Appl. No. 15/191,241, filed Jun. 23, 2016.
Kizuki, "Algorithm inspired by Peripheral Vision and Involuntary Eye Shift", Journal of the Japan Society for Precision Engineering, vol. 79, No. 11, 2013, p. 1045-1049.

* cited by examiner

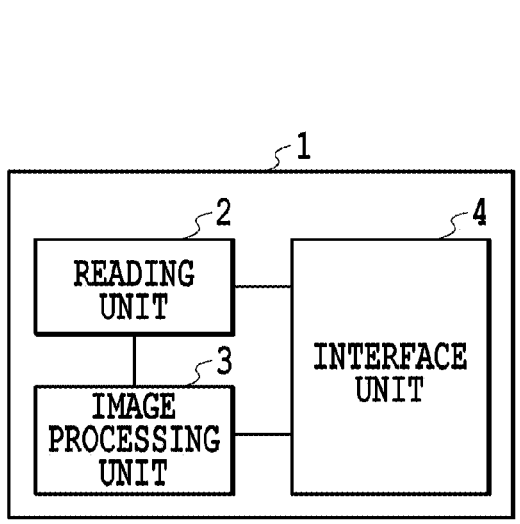
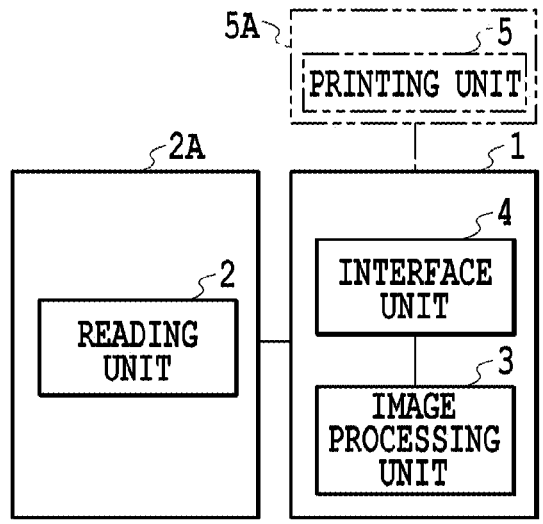
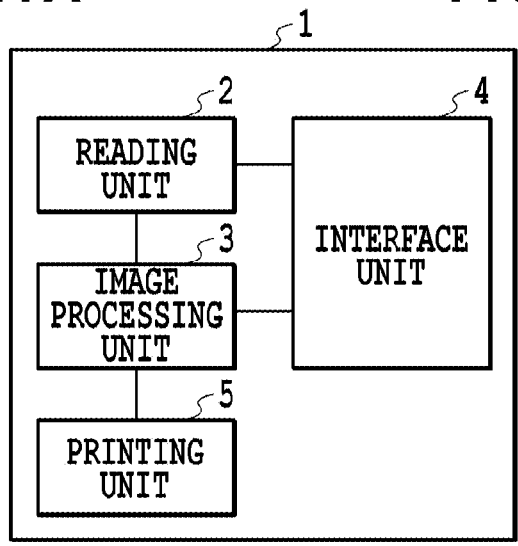
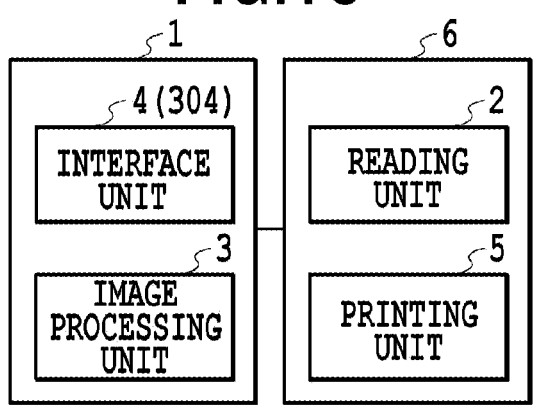
FIG.1A
FIG.1B
FIG.1C
FIG.1D

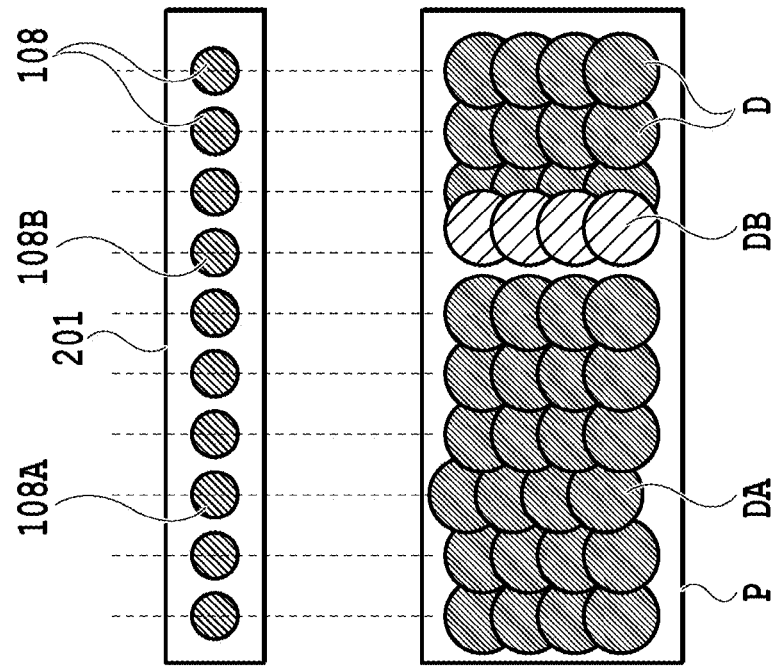
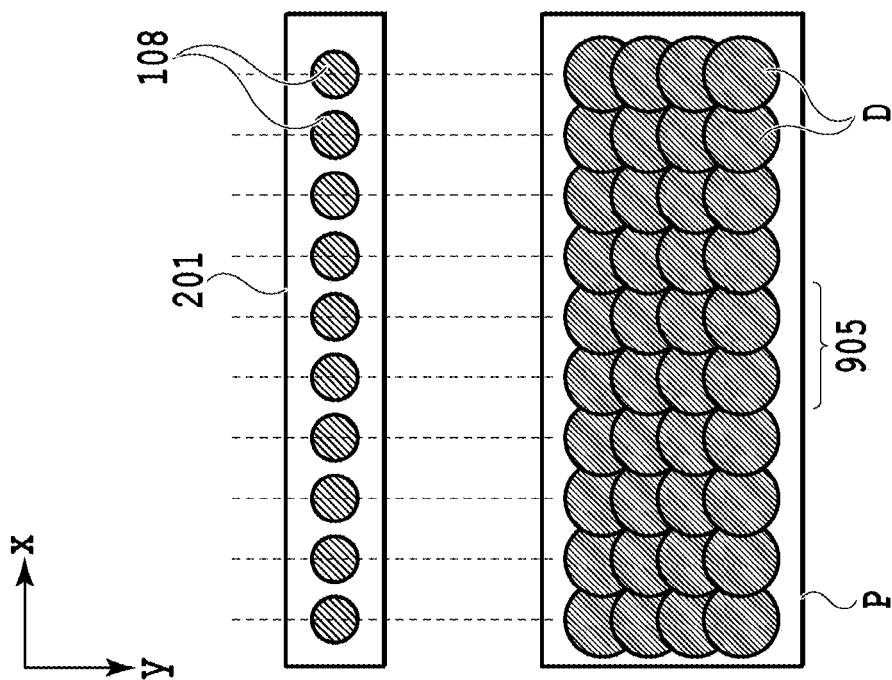

IMAGE PROCESSING APPARATUS AND IMAGE PROCESSING METHOD

BACKGROUND OF THE INVENTION

Field of the Invention

The present invention relates to an image processing apparatus for determining a unique portion (an unusual portion including a defect) in a print image on the basis of data resulting from reading the print image.

Description of the Related Art

Japanese Patent Laid-Open No. 2013-185862 and ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection object in accordance with a human visual mechanism. Specifically, after imaging an inspection object, the resulting image is divided into division areas having a predetermined size, and a luminance value in each division area is averaged and quantized. In addition, such image processing is repeated using different sizes and/or phases of a division area, the resulting values quantized in the repeated image processing are added, and on the basis of the addition result a defect in the inspection object is detected. By employing such a method, a defect of an inspection object can be efficiently extracted and made apparent without any human observation.

However, when employing the algorithm disclosed in Japanese Patent Laid-Open No. 2013-185862 and "KIZUKI" Algorithm inspired by Peripheral Vision and Involuntary Eye Movement", Journal of the Japan Society for Precision Engineering, Vol. 79, No. 11, 2013, p. 1045-1049, it is desirable to make various parameters such as the read resolution of an inspection object and the division size in image processing suitable in order to effectively detect a defect in the inspection object. For example, an image printed by an inkjet printing apparatus may have, as a unique portion, a stripe-like defect and density unevenness, and a read resolution and division size for effectively detecting these stripe-like defect and density unevenness vary depending on the features of the stripe-like defect and density unevenness. However, Japanese Patent Laid-Open No. 2013-185862 and "KIZUKI" Algorithm inspired by Peripheral Vision and Involuntary Eye Movement", Journal of the Japan Society for Precision Engineering, Vol. 79, No. 11, 2013, p. 1045-1049 do not describe the relation between the feature of a defect to be detected and its corresponding suitable parameters.

SUMMARY OF THE INVENTION

The present invention provides an image processing apparatus and image processing method that are able to efficiently and certainly determine a unique portion in a print image by setting parameters in accordance with features of the unique portion appearing in the print image.

In the first aspect of the present invention, there is provided an image processing apparatus comprising:

an acquisition unit configured to acquire image data resulting from reading an image printed sequentially in a first direction;

a setting unit configured to set a division size in the first direction and a second direction of a division area for dividing the image data, the second direction crossing the first direction, as well as a shift amount in the first direction and the second direction of the division area;

a processing unit configured to perform a predetermined process including an averaging process on the image data according to the division size and the shift amount, a quantization process for quantizing a value obtained by performing the averaging process on image data in each division area shifted in accordance with the shift amount, and an addition process for adding values obtained by the quantization process; and an extraction unit configured to extract a unique portion from image data on which the predetermined process has been performed; wherein the setting unit sets (i) the division size greater in the first direction than in the second direction, and/or (ii) the shift amount greater in the first direction than in the second direction.

In the second aspect of the present invention, there is provided an image processing apparatus comprising:

an acquisition unit configured to acquire image data resulting from reading an image printed sequentially in a first direction;

a processing unit configured to perform a predetermined process including a filtering process using a filter on the image data;

a setting unit configured to set a size in the first direction and a second direction of the filter, the second direction crossing the first direction; and an extraction unit configured to extract a unique portion from image data on which the predetermined process has been performed, wherein the setting unit sets a size of the filter greater in the first direction than in the second direction.

In the third aspect of the present invention, there is provided an image processing method comprising:

an acquisition step of acquiring image data resulting from reading an image printed sequentially in a first direction;

a setting step of setting a division size in the first direction and a second direction of a division area for dividing the image data, the second direction crossing the first direction, as well as a shift amount in the first direction and the second direction of the division area;

a processing step of performing a predetermined process including an averaging process on the image data according to the division size and the shift amount, a quantization process for quantizing a value obtained by performing the averaging process on image data in each division area shifted in accordance with the shift amount, and an addition process for adding values obtained by the quantization process; and an extraction step of extracting a unique portion from image data on which the predetermined process has been performed; wherein the setting step sets (i) the division size greater in the first direction than in the second direction and/or (ii) the shift amount greater in the first direction than in the second direction.

In the fourth aspect of the present invention, there is provided an image processing method comprising:

an acquisition step of acquiring image data resulting from reading an image printed sequentially in a first direction;

a processing step of performing a predetermined process including a filtering process using a filter on the image data;

a setting step of setting a size in the first direction and a second direction of the filter, the second direction crossing the first direction; and an extraction step of extracting a unique portion from image data on which the predetermined process has been performed; wherein the setting step sets a size of the filter greater in the first direction than in the second direction.

According to the present invention, by setting parameters in accordance with features of a unique portion appearing in a print image in association with a print direction of the print image, the unique portion can be efficiently and certainly determined.

Further features of the present invention will become apparent from the following description of exemplary embodiments (with reference to the attached drawings).

BRIEF DESCRIPTION OF THE DRAWINGS

FIGS. 1A to 1D are explanatory diagrams each illustrating an example of a different form of an image processing apparatus usable in the present invention;

FIGS. 15A and 15B are diagrams for explaining density unevenness due to non-uniformity of ink landing positions;

DESCRIPTION OF THE EMBODIMENTS

Figure 2:
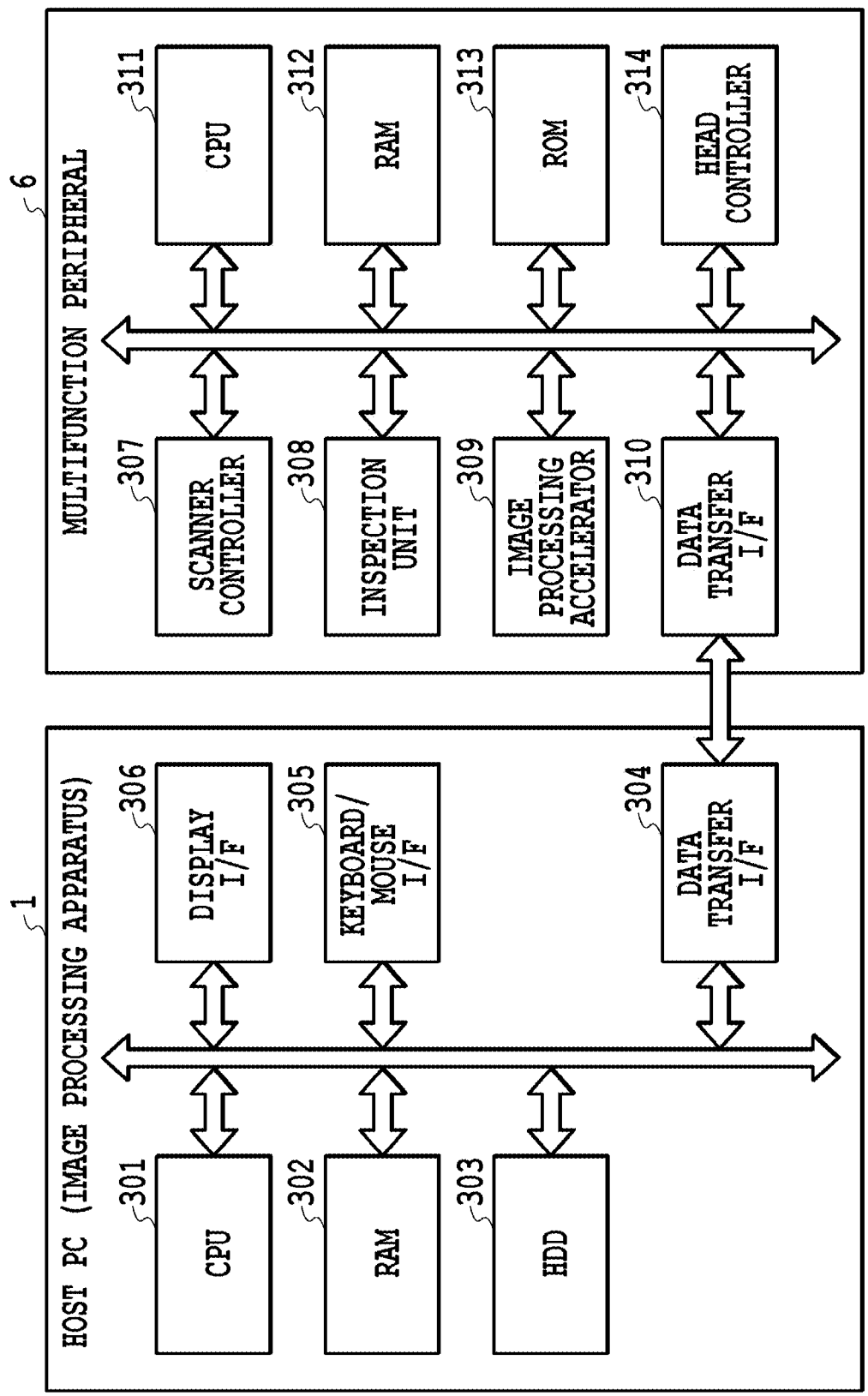
FIG. 2 is a block diagram for explaining a configuration of a control system in an image processing system.

FIGS. 1A to 1D are diagrams each illustrating an example of a different form of an image processing apparatus 1 that can be used in the present invention. The image processing apparatus of the present invention processes image data resulting from reading a print image in order to determine a unique portion (an unusual portion including a defect) appearing in the print image, and can employ various forms as a system.

FIG. 1A illustrates a form in which the image processing apparatus 1 includes a reading unit 2. For example, this form corresponds to the case where an inkjet printing apparatus prints a predetermined image on a sheet, the printed sheet is placed on a reading table of the reading unit 2 inside the image processing apparatus 1 and imaged by an optical sensor or the like, and the resulting image data is processed by an image processing unit 3. The image processing unit 3 includes a CPU or an image processing accelerator capable of higher speed processing than the CPU, controls a reading action by the reading unit 2 and processes read image data.

FIG. 1B illustrates a form in which an image processing apparatus 1 is externally connected to a reading apparatus 2A including the reading unit 2. For example, this form corresponds to a system in which a PC is connected to a scanner. Methods for the connection may include a general one such as USB, GigE, or Camera Link. Image data read by the reading unit 2 is provided through an interface 4 to the image processing unit 3 and processed in the image processing unit 3. In this form, the image processing apparatus 1 may be further externally connected to a printing apparatus 5A including a printing unit 5.

FIG. 1C illustrates a form in which the image processing apparatus 1 includes the reading unit 2 and the printing unit 5. For example, this form corresponds to a multifunction peripheral including a scanner function, a printer function, and an image processing function. The image processing unit 3 controls all of a printing action by the printing unit 5, a reading action by the reading unit 2, and processing of image data read by the reading unit 2. FIG. 1D illustrates a form in which the image processing apparatus 1 is externally connected to a multifunction peripheral 6 including the reading unit 2 and the printing unit 5. For example, this form corresponds to a system in which a PC is connected to a multifunction peripheral including both of a scanner function and a printer function. The image processing apparatus 1 of the present invention can employ any of the forms in FIGS. 1A to 1D.

The image processing apparatus 1 of the present invention can employ any of the forms in FIGS. 1A to 1D. In the following, embodiments of the present invention will be described in detail, referring to the form illustrated in FIG. 1D, as an example.

First Embodiment

FIG. 2 is a block diagram for explaining a configuration of a control system in the form in FIG. 1D. The image processing apparatus 1 includes a host PC, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 and a program held in the HDD 303, and transfers the image data to the multifunction peripheral 6. Also, the CPU 301 performs a predetermined process in accordance with programs stored in the HDD 303 on image data received from the multifunction peripheral 6 through a data transfer I/F 304, and displays the result of the process or various pieces of information on an unillustrated display through a display I/F 306. It is also possible that the multifunction peripheral 6 notifies the image processing apparatus 1 (host PC) that a defective portion as a unique portion in an image has been detected, and an unillustrated display displays the result. For example, the display also may display a print image area where the image defective portion exists.

In the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image processing; a scanner controller 307 for controlling the reading unit 2; a head controller 314 for controlling the printing unit 5; and an inspection unit 308. The image processing accelerator 309 is hardware capable of performing image processing at higher speed than the CPU 311. The image processing accelerator 309 is activated by the CPU 311 writing parameters and data necessary for image processing in a predetermined address in the RAM 312, and after reading the parameters and data, performs predetermined image processing on the data. Note that the image processing accelerator 309 is not an indispensable component, and the CPU 311 can perform an equivalent process.

The head controller 314 supplies print data to a print head provided in the printing unit 5 as well as controlling a printing action of the print head. The head controller 314 is activated by the CPU 311 writing print data printable by the print head and control parameters in a predetermined address of the RAM 312, and performs an ejecting action in accordance with the print data. The scanner controller 307 controls respective reading elements arrayed in the reading unit 2 and at the same time outputs RGB luminance data obtained from the reading elements to the CPU 311. The CPU 311 transfers the obtained RGB luminance data to the image processing apparatus 1 through a data transfer I/F 310. As a method for the connection between the data transfer I/F 304 of the image processing apparatus 1 and the data transfer I/F 310 of the multifunction peripheral 6, a USB, IEEE 1394 or LAN, for example, can be used.

The inspection unit 308 inspects an inspection image obtained by the reading unit 2 for a defect or image degradation in the print image printed by the printing unit 5. It is desirable to perform preprocessing necessary for inspection on the inspection image. The inspection unit 308 can feed back the inspection result to the printing unit 5 and cause the printing unit 5 to perform a process necessary for improving a print image, as well as notifying a user of the inspection result through a display. In addition, the size of an image defect a user wants to detect may be set through a user interface (UI).

The printing unit 5 in this example uses an inkjet print head as described later, and multiple nozzles (printing elements) capable of ejecting ink are arranged on the print head so as to form a nozzle array. The nozzles are configured to eject ink from ejection ports by using an ejection energy generating element. The ejection energy generating element such as an electrothermal transducer (heater) or a piezoelectric element can be used. If the electrothermal transducer is used, then its heat generation can foam ink, and the foaming energy can be used to eject ink from the ejection port. In the following, the case will be explained where the electrothermal transducer is used in the print head.

To such a printing unit can be fed back an inspection result of an inspection image. For example, if a defect of a print image is due to ink ejection failure in a nozzle, a recovery action is performed for improving the ink ejection state in the nozzle. If printing to be performed by a nozzle having ink ejection failure can be compensated by a surrounding nozzle of the nozzle having ink ejection failure, a process is performed that assigns the ejection data of the nozzle having ejection failure to the surrounding nozzle or a nozzle for ejecting a different ink. If a defect of a print image is due to variations in amount of ink ejection, then a drive pulse of a nozzle for ejecting ink may be controlled to correct an ink ejection amount or the number of ink dots formed may be controlled to achieve a uniform print density. If deviation of landing positions of ink droplets is detected, the drive pulse is controlled to adjust the landing positions of the ink droplets.

Figure 3:
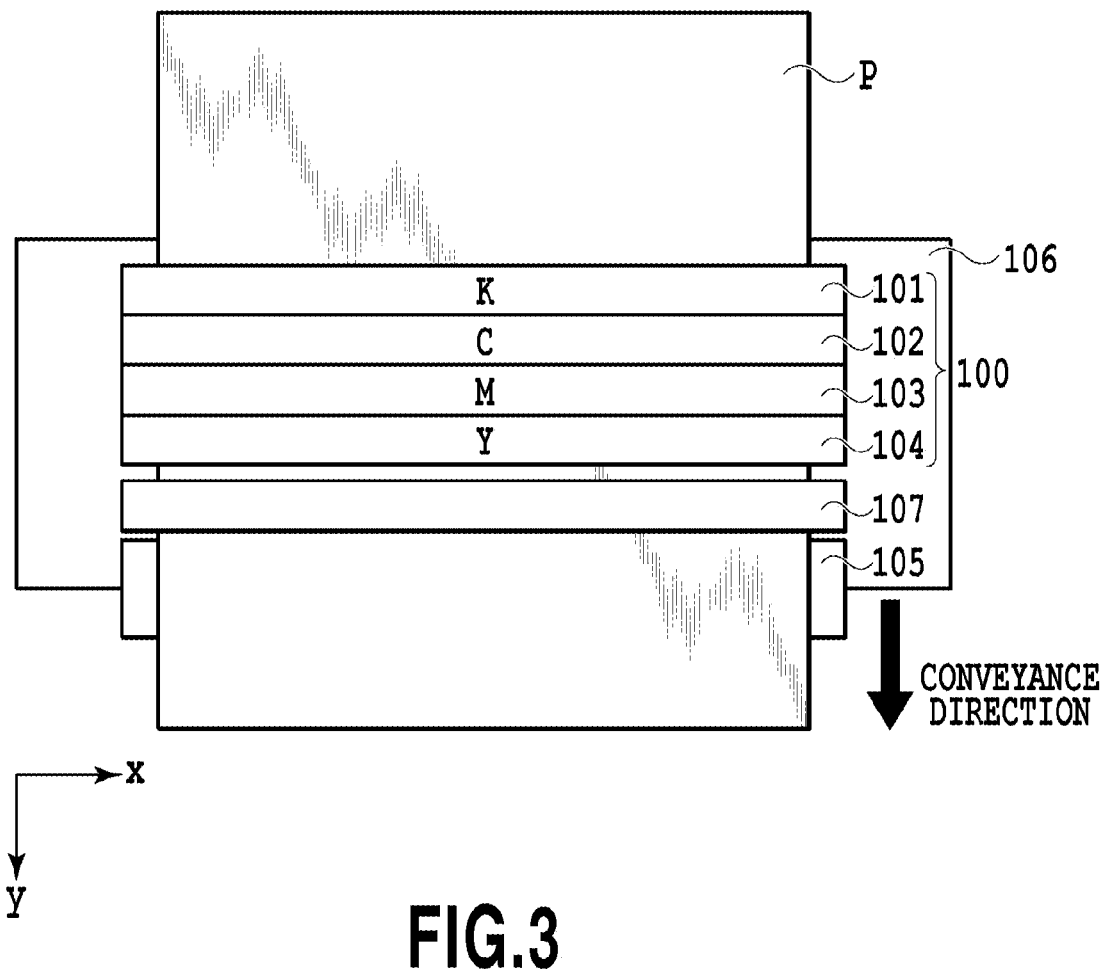
FIG. 3 is a schematic configuration diagram of an inkjet printing apparatus as a multifunction peripheral usable in the present invention.

FIG. 3 is a schematic configuration diagram illustrating an inkjet printing apparatus (hereinafter also simply referred to as a printing apparatus) usable as the multifunction peripheral 6 according to the present embodiment. The printing apparatus in this embodiment is a full-line type printing apparatus, in which a print head 100 and a read head 107 are arranged in parallel. The print head 100 and read head 107 have the same width as a print medium and a sheet P that may be an inspection object. The print head 100 includes four printing element arrays 101 to 104 ejecting black (K), cyan (c), magenta (M), yellow (y) inks, respectively. These printing element arrays 101 to 104 extend in the direction crossing (in this example, orthogonal to) a conveyance direction (y direction) of the sheet P, and are arranged in parallel such that they are at slightly different positions in the conveyance direction. Downstream in the conveyance direction of the printing element arrays 101 to 104, the read head 107 is disposed. In the read head 107, multiple reading elements for reading a printed image are arrayed in a x direction.

In performing printing and reading processes, the sheet P is conveyed in the conveyance direction indicated by the arrow y at a predetermined speed along with rotation of a conveyance roller 105, and during the conveyance, the printing process by the print head 100 and the reading process by the read head 107 are performed. The sheet P is supported from below by a flat plate-shaped platen 106 at a position where the printing process by the print head 100 and the reading process by the read head 107 are performed, which maintains a distance between the sheet P and the print head 100 and read head 107, and smoothness of the sheet P.

Figure 4A:
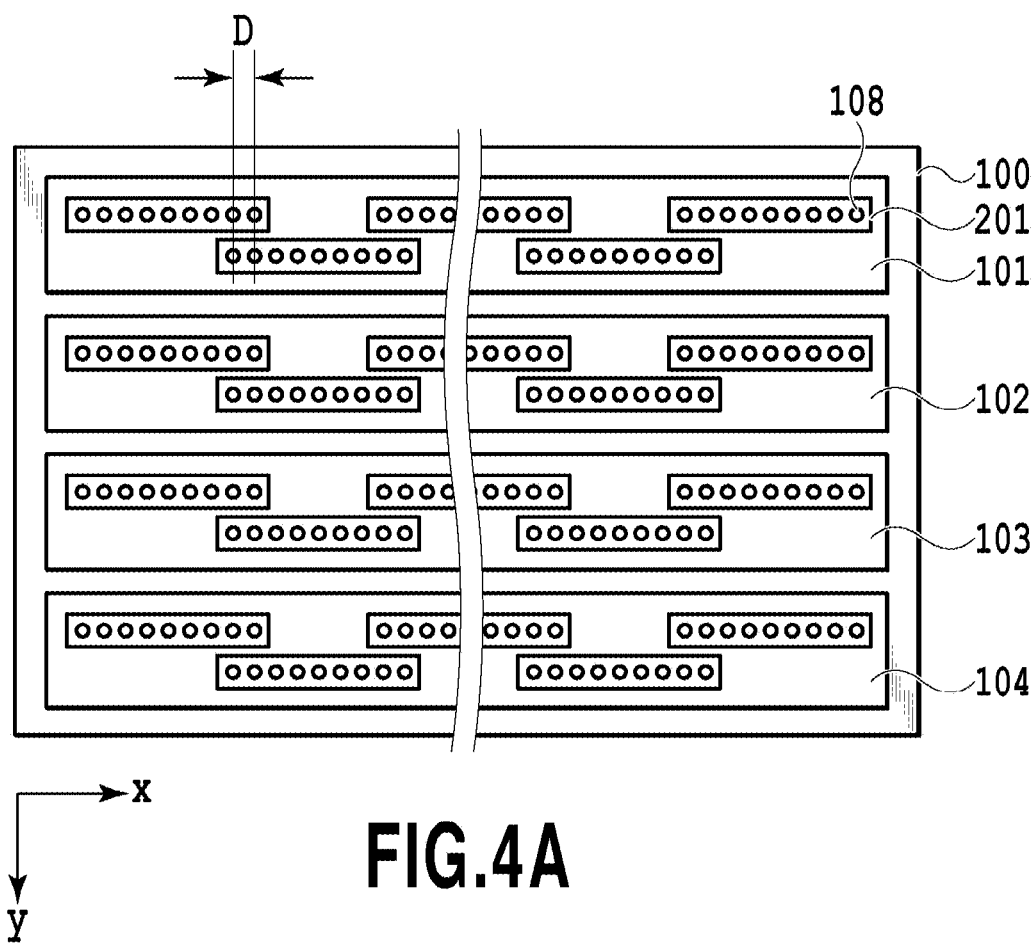
FIGS. 4A and 4B are explanatory diagrams illustrating the array configuration of printing elements and the array configuration of reading elements, respectively.
Figure 4B:
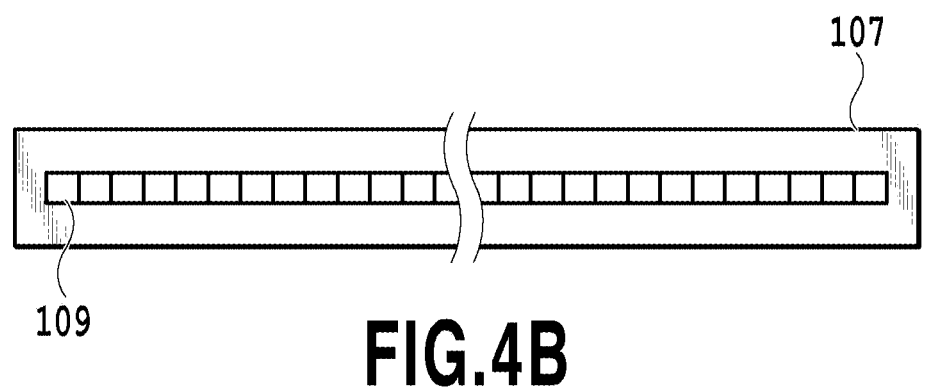

FIGS. 4A and 4B are diagrams illustrating the array configuration of the printing elements in the print head 100 and the array configuration of the reading elements in the read head 107, respectively. In the print head 100, each of the printing element arrays 101 to 104 corresponding to each ink color, is composed of multiple printing element substrates (head chips) 201 on which multiple printing elements 108 are arrayed at constant pitches. The printing element substrates 201 are arranged continuously in the x direction and alternately in the y direction while providing overlap regions D. The respective printing elements 108 eject ink at a constant frequency on the basis of print data onto the sheet P being conveyed in the y direction at a constant speed thereby to print an image on the sheet P at a resolution corresponding to the array pitch of the printing elements 108. The print head may have a form in which multiple colors of inks are ejected from one print head, or may have a form in which different print heads are configured for respective ink colors and these print heads are combined. Further, the print head may have a form in which printing element arrays corresponding to multiple color inks are arrayed on one printing element substrate.

In the read head 107, multiple reading sensors 109 are arrayed in the x direction at a predetermined pitch. Further, although not illustrated in the FIG. 4B, each reading sensor 109 is composed such that multiple reading elements, which may be the minimum unit of read pixels, are arrayed in the x direction. The reading elements of the respective reading sensors 109 image, at a predetermined frequency, an image on the sheet P being conveyed in the y direction at a constant speed, and thereby the whole image printed on the sheet P can be read at the array pitch of the reading elements. The read head 107 outputs luminance data resulting from reading the image. The read head 107 in this example outputs only luminance data, but the read head 107 may output RGB data or CMY data. When multiple color components are output, they may be processed on a color component basis. The read head 107 in this example is a line-type in which the reading sensors 109 are arranged in a line-like manner, but the read head 107 may be an area-type in which the reading sensors 109 are arranged in a planar manner, or may use an inspection camera. The configuration of the reading sensor 109 is not limited.

In the following, a detection algorithm of a unique portion according to the present embodiment will be specifically described. The unique portion includes a defect, such as defective printing and image degradation in a print image. Hereinafter, a detection process for the unique portion will be also referred to as a defect detection process. In the detection algorithm in this embodiment, a print image is imaged, and image processing for extracting a unique portion in the print image from the acquired image data is performed. Although image printing may not be necessarily performed by an inkjet printing apparatus as the multi-function peripheral 6, in the following a case will be described where an image printed by the print head 100 of the multi-function peripheral 6 is read by the read head 107.

Figure 5:
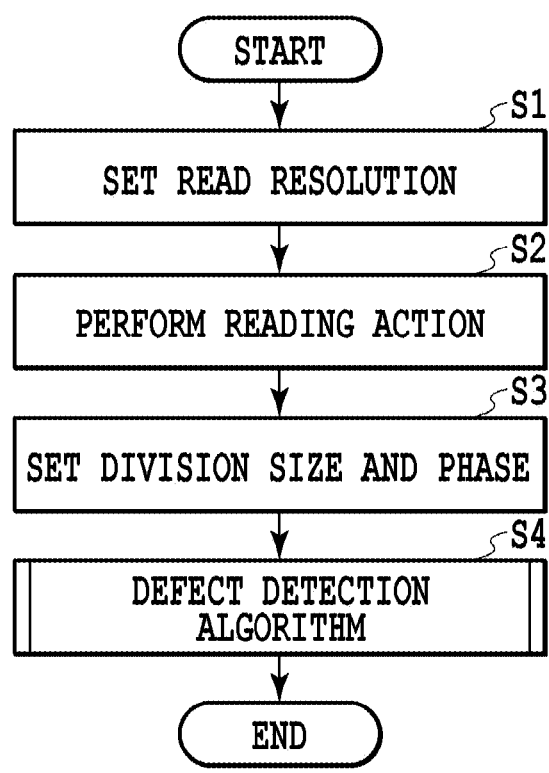
FIG. 5 is a flowchart illustrating the basic steps of defect detection according to a first embodiment of the present invention.

FIG. 5 is a flowchart for explaining a basic process performed by the image processing apparatus 1 of this example. When this process is started, in Step S1, the image processing apparatus 1 sets a read resolution. A specific setting method will be described later. In subsequent Step S2, in accordance with the read resolution set in Step S1, an inspection target image is read. That is, a scanner controller 307 is driven to obtain output signals from the multiple reading elements arranged on a reading sensor 109, and image data corresponding to the read resolution set in Step S1 is generated on the basis of these output signals. In this example, image data is luminance signals of R (red), G (green), and B (blue).

In Step S3, the CPU 301 sets division sizes and phases to be used for a defect extraction process performed in the subsequent Step S4. The definitions of the division size and phase will be described later. In Step S3, at least one type of the division size and phase are set, respectively. In Step 4, on the basis of the division size and phase set in Step S3, the defect detection algorithm is performed on the image data generated in Step S2.

Figure 6:
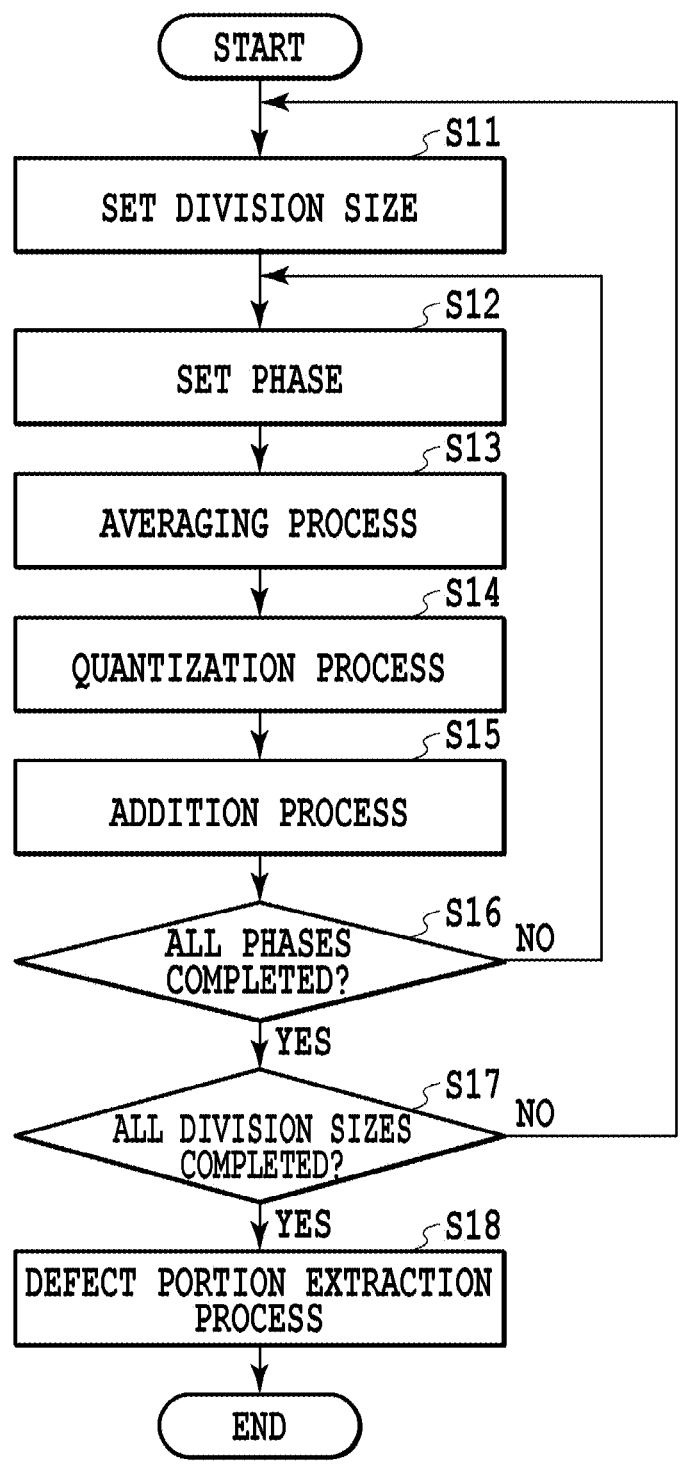
FIG. 6 is a flowchart illustrating a defect detection algorithm according to the first embodiment of the present invention.

FIG. 6 is a flowchart for explaining steps of the defect detection algorithm performed by the CPU 301 in Step S4. When this process is started, in Step S11, the CPU 301 first sets one division size from the multiple division sizes set in Step 3. Further, in Step S12, one phase is set from the multiple phases set in Step S3. In Step S13, on the basis of the division size set in Step S11 and the phase set in Step S12, the image data acquired in Step S2 is divided and an averaging process is performed on the divided image data.

Figure 7A:
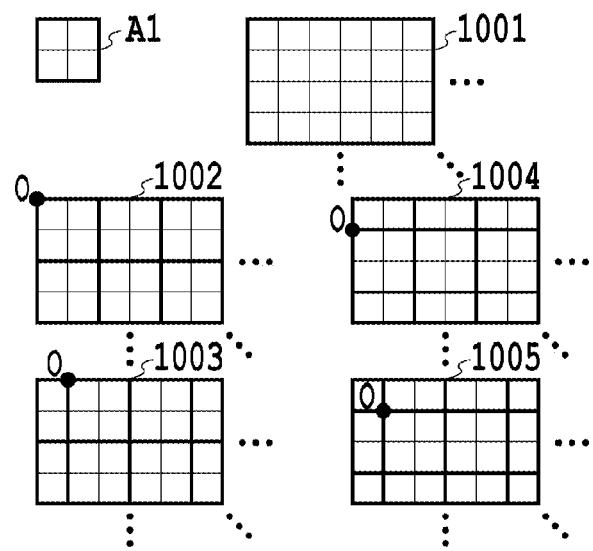
FIGS. 7A to 7C are explanatory diagrams each illustrating a different division state of image data.
Figure 7B:
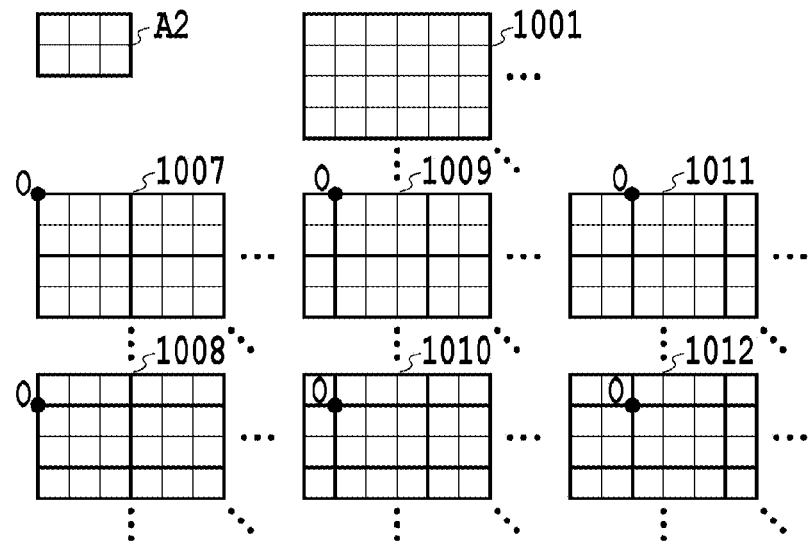
Figure 7C:
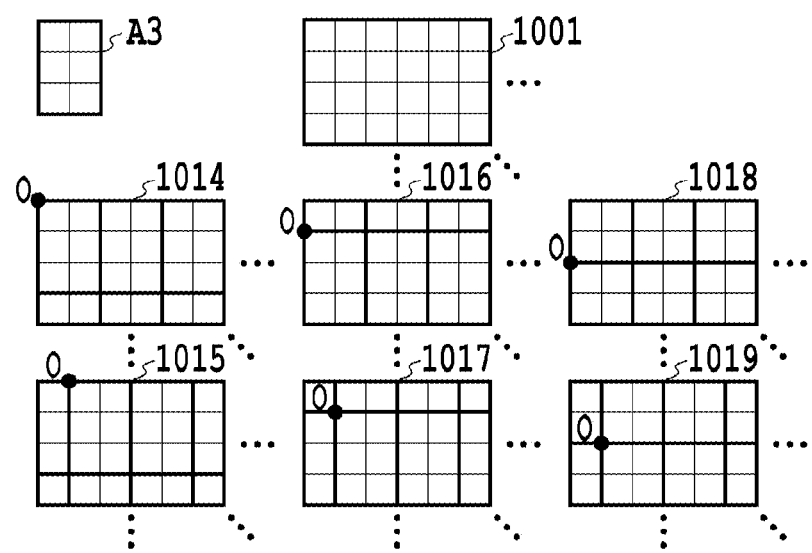

FIGS. 7A to 7C are diagrams for explaining image data division states on the basis of the division sizes and phases. FIG. 7A illustrates the case where the division size is set to 2×2 pixels, FIG. 7B illustrates the case where the division size is set to 3×2 pixels, and FIG. 7C illustrates the case where the division size is set to 2×3 pixels. If the division size A1 is set to 2×2 pixels as in FIG. 7A, then an image data area 1001 is divided on a 2×2 pixel basis and can be divided in four ways as indicated by 1002 to 1005, meaning that four types of corresponding phases are present. As described, the phase can be considered as indicating the origin O of a division size in the image data area 1001. If the division size A2 is set to 3×2 pixels as in FIG. 7B, then the image data area 1001 can be divided in six ways as indicated by 1007 to 1012, meaning that six types of phases are present. If the division size A3 is set to 2×3 pixels as in FIG. 7C, then the image data area 1001 can be divided in six ways as indicated by 1014 to 1019, meaning that six types of phases are present.

As a division size is larger, the number of settable phases also is greater. All phases may not be necessarily set for one division size. In Step S3 in FIG. 5, at least some of settable phases have only to be set; and in Step S12 in FIG. 6, one of the phases set in Step S3 has only to be set. The order of the division size setting and the phase setting may be opposite.

Figure 8A:
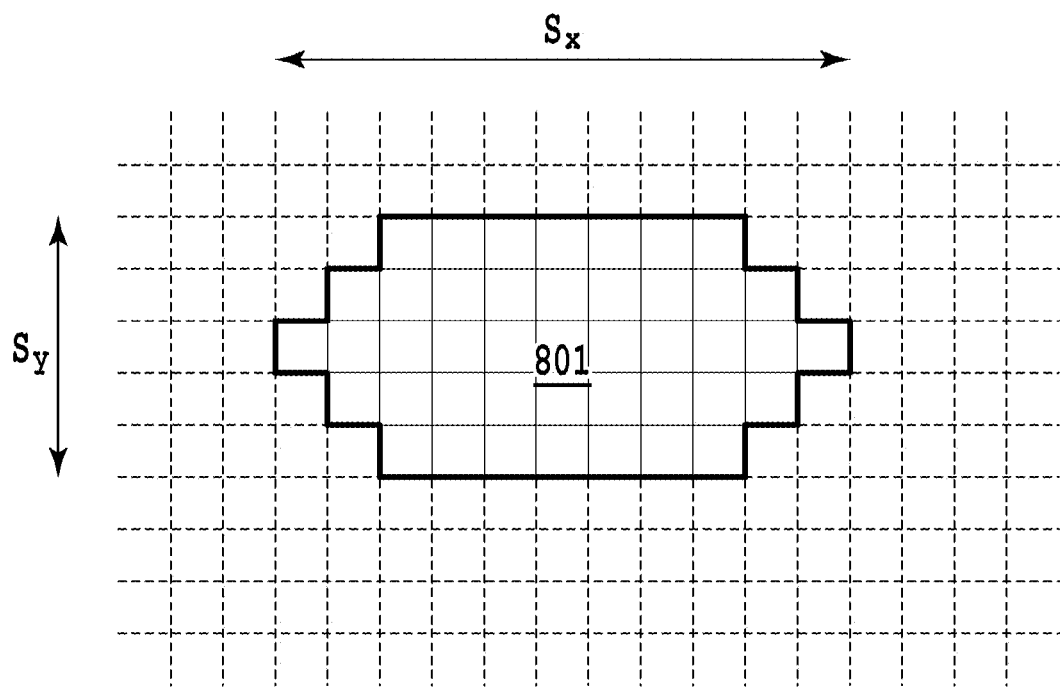
FIGS. 8A and 8B are explanatory diagrams each illustrating another division state of image data.
Figure 8B:
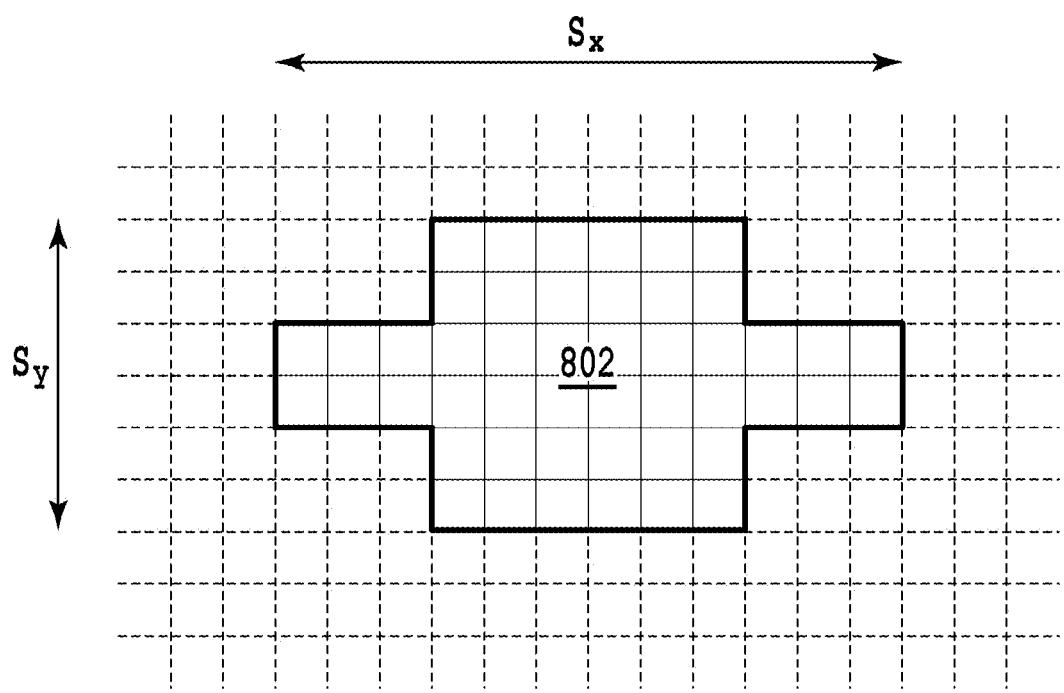

In FIGS. 7A to 7C, the method for dividing image data into squares is explained, but image data may be divided into other shapes than square. FIGS. 8A and 8B illustrate other division shapes. Image data may be divided by the shapes illustrated in FIGS. 8A and 8B. That is, as in FIG. 8A, image data may be divided by a division shape 801 including step-like portions, or as in FIG. 8B, image data may be divided by a division shape 802 including bumps. Image data may be divided by a circle. In short, in dividing image data division shapes are not particularly limited. Image data may be divided by other shapes according to other characteristics of a defect or characteristics of the apparatus.

Returning to FIG. 6, in Step S13, the averaging process is performed on each of the division areas resulting from the division in Step S12. Specifically, for multiple pixels included in the division area, the average value of pieces of luminance data of the respective pixels is found. When doing so, the pieces of luminance data corresponding to the respective pixels may be obtained by directly averaging pieces of RGB luminance data of the respective pixels, or by multiplying the pieces of RGB luminance data respectively by predetermined weighting coefficients and then adding the pieces of weighted data. Further, luminance data of one of RGB colors may be directly used as luminance data of a pixel.

In Step S14, the average value calculated in Step S13 is quantized on a pixel basis. The quantization may be binarization or multivalued quantization into several levels. In doing so, quantized data is obtained in the state where quantized values of respective pixels are uniform within each of the division areas.

In Step S15, the quantized values obtained in Step S14 are added to addition image data. The addition image data refers to image data indicating a result of adding pieces of quantized data obtained when variously changing the division size (Sx, Sy) and phase. If the quantized data obtained in Step S14 is based on the initial division size and the initial phase, the addition image data obtained in Step S15 is the same as the quantized data obtained in Step S14.

In subsequent Step S16, the image processing apparatus 1 determines whether or not all the phases have been processed with respect to a currently set division size. If the image processing apparatus 1 determines that a phase to be processed still remains, the flow returns to Step S12 where the next phase is set. On the other hand, if the image processing apparatus 1 determines that all the phases have been processed, the flow proceeds to Step S17.

FIGS. 9A to 9D and FIGS. 10A to 10I are diagrams schematically illustrating the steps in which the addition process in Step S15 is sequentially performed for all the phases in predetermined division sizes. If the division size (Sx, Sy) is set to 2×2 pixels, four different phases are present. In FIGS. 9A to 9D, in the process of sequentially changing the four different phases, the number of times of using luminance data of a neighboring pixel in order to perform the addition process of a target pixel Px is indicated on a pixel basis. If the division size (Sx, Sy) is set to 3×3 pixels, nine different phases are present. In FIGS. 10A to 10I, in the process of sequentially changing the nine different phases, the number of times of using luminance data of a neighboring pixel in order to perform the addition process of a target pixel Px is indicated on a pixel basis.

Figure 9A:
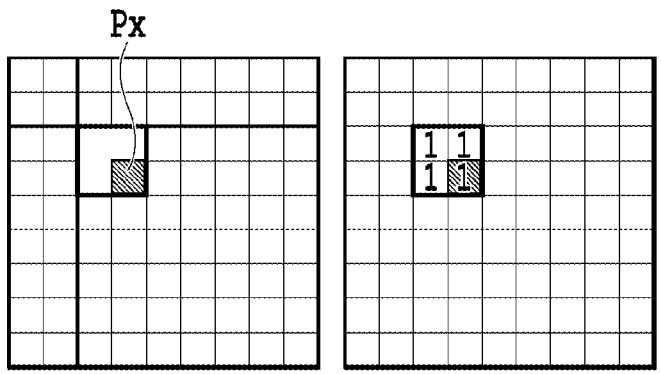
FIGS. 9A to 9E are schematic diagrams illustrating an addition process in a division size of 2×2 pixels.
Figure 9B:
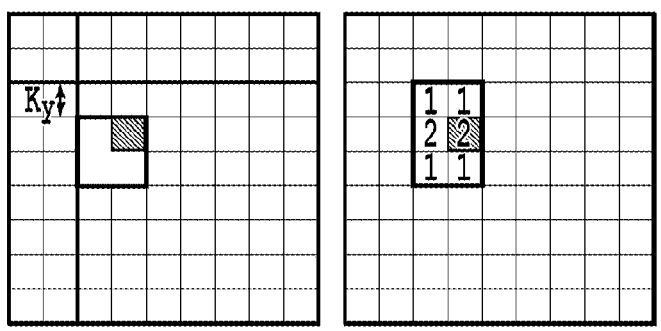
Figure 9C:
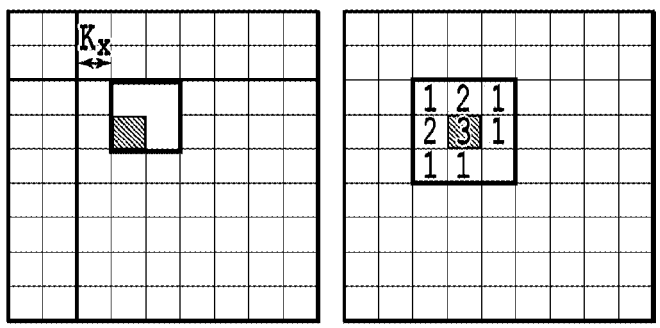
Figure 9D:
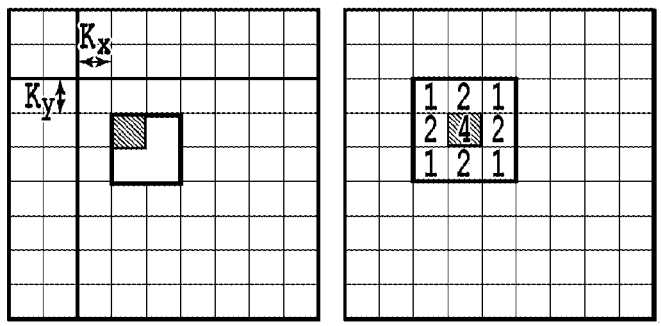
Figure 10A:
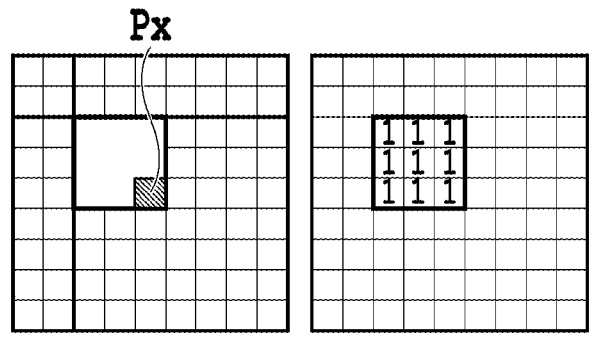
FIGS. 10A to 10J are schematic diagrams illustrating an addition process in a division size of 3×3 pixels.
Figure 10B:
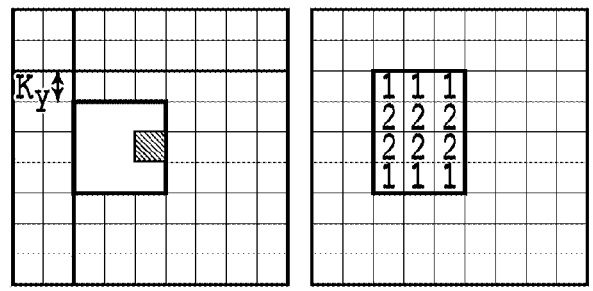
Figure 10C:
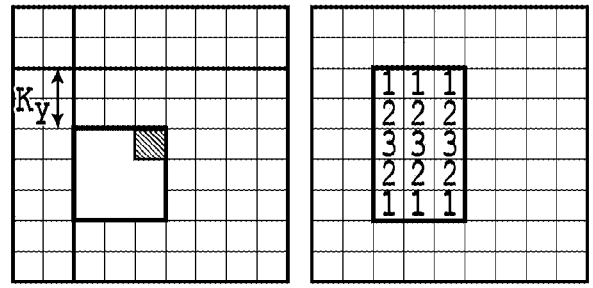
Figure 10D:
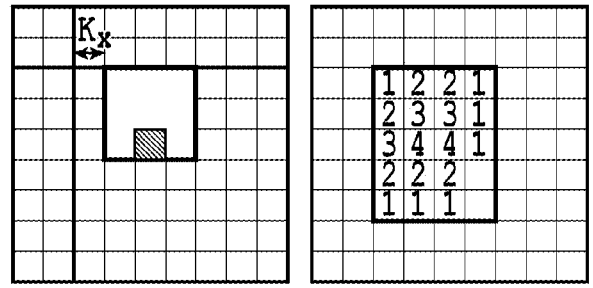
Figure 10E:
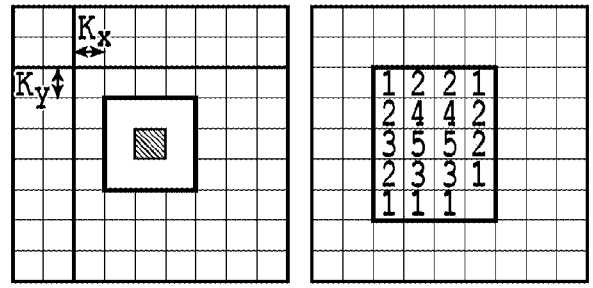
Figure 10F:
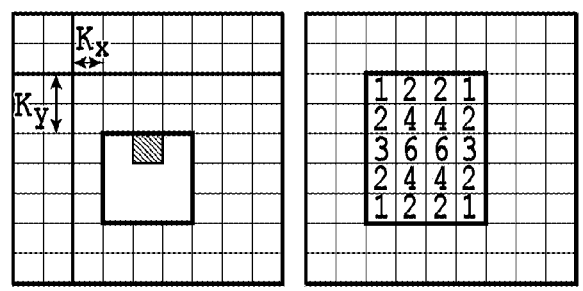
Figure 10G:
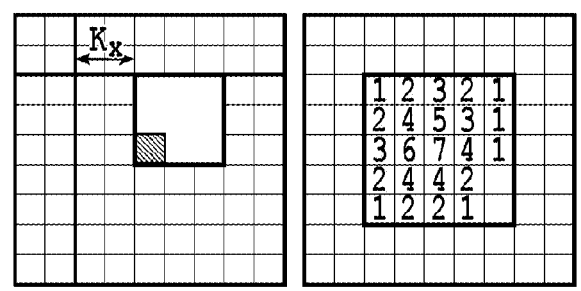
Figure 10H:
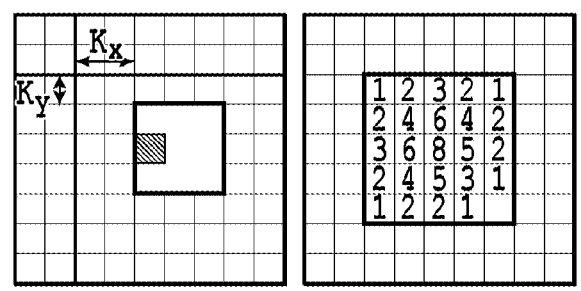
Figure 10I:
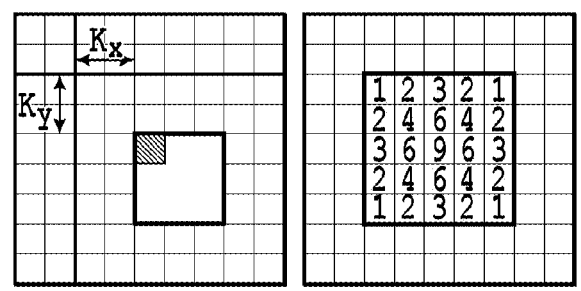

FIGS. 9A and 10A illustrate initial states (initial phases) in which a shift amount (Kx, Ky) is (0, 0). FIGS. 9B to 9D illustrate the states obtained by changing the phase from the initial phase in FIG. 9A. FIGS. 10B to 10I illustrate the states obtained by changing the phase from the initial phase in FIG. 10A. FIGS. 9B and 10B illustrate the phases shifted by one pixel in the y direction, whose shift amount (Kx, Ky) is (0, 1). FIGS. 9C and 10D illustrate the phases shifted by one pixel in the x direction, whose shift amount (Kx, Ky) is (1, 0). FIGS. 9D and 10E illustrate the phases shifted by one pixel in both of the x and y directions, whose shift amount (Kx, Ky) is (1, 1). FIG. 10C illustrates the phase whose shift amount (Kx, Ky) is (0, 2). FIG. 10F illustrates the phase whose shift amount (Kx, Ky) is (1, 2). FIG. 10G illustrates the phase whose shift amount (Kx, Ky) is (2, 0). FIG. 10H illustrates the phase whose shift amount (Kx, Ky) is (2, 1). FIG. 10I is the phase whose shift amount (Kx, Ky) is (2, 2).

Figure 9E:
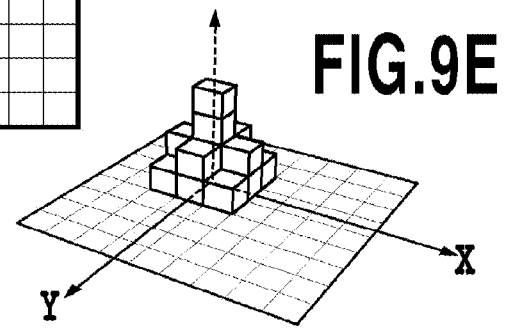
Figure 10J:
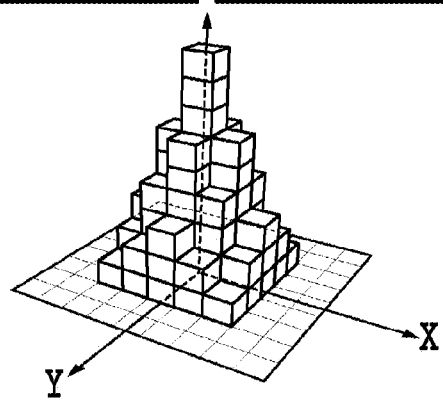

In any of FIGS. 9B to 9D and 10B to 10I, since the target pixel Px is used for all the phases in which the target pixel Px is included in a division area, the target pixel Px has the largest number of additions and has the largest contribution to the addition result. A pixel more distant from the target pixel Px has the smaller number of additions, and has a smaller contribution to the addition result. That is, by changing the phase, ultimately a result is obtained such that a filtering process is performed with the target pixel as the center, as illustrated in FIGS. 9E and 10J.

Returning to the flowchart in FIG. 6, in Step S17 the image processing apparatus 1 determines whether or not all the division sizes set in Step S3 in FIG. 5 have been processed. If the image processing apparatus 1 determines that a division size to be processed still remains, the flow returns to Step S11 where the next division size is set. This repetition of the process using multiple types of division sizes can cancel periodicity hidden behind an image, making a defect portion (unique portion) apparent. On the other hand, if the image processing apparatus 1 determines that all the division sizes have been processed, the flow proceeds to Step S18.

In Step S18, the defect portion (unique portion) extraction process is performed on the basis of currently obtained addition image data. In this process, a portion where a variation in signal value is large in comparison with pieces of its surrounding luminance data is extract as a defect portion. The extraction process is not particularly limited to this, and a publicly known determination process can be used. This process ends here.

The defect detection algorithm described with FIG. 6 calculates addition data on the basis of the average values of all pixels included in division areas that shift around the target pixel Px as described with FIGS. 9A to 9E and FIGS. 10A to 10J. For this reason, a target pixel positioned in an end part of print image data may not be properly processed because the division area includes an area where no data is present. In order to deal with such a situation, in this example, dummy image data is preliminarily attached around inspection target image data.

Figure 11C:
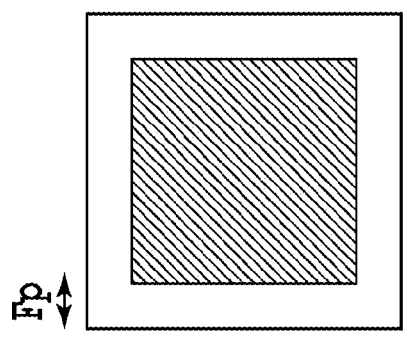
FIGS. 11A to 11C are diagrams for explaining a method of generating dummy data.
Figure 11B:
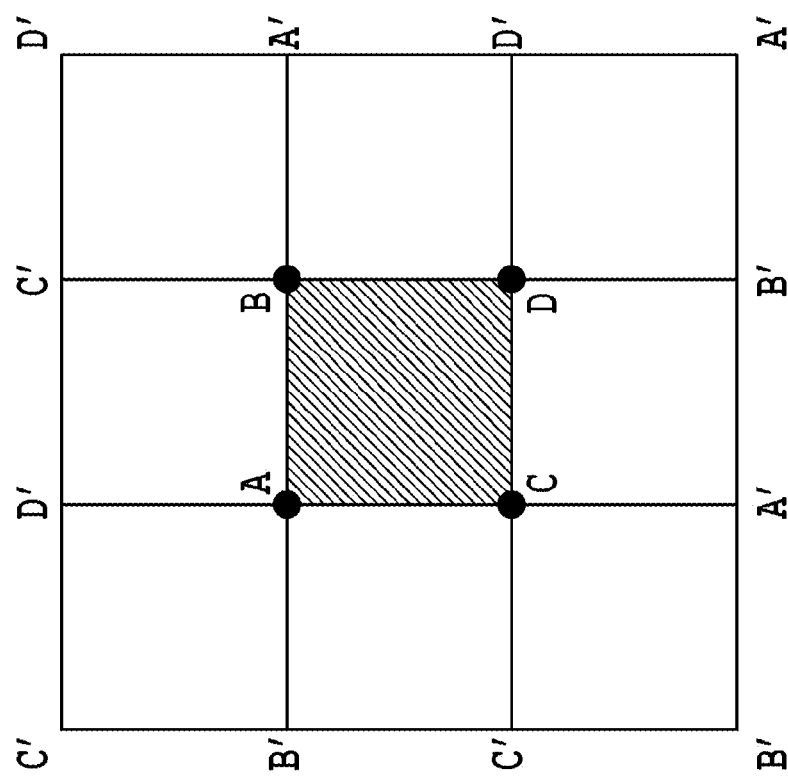
Figure 11A:
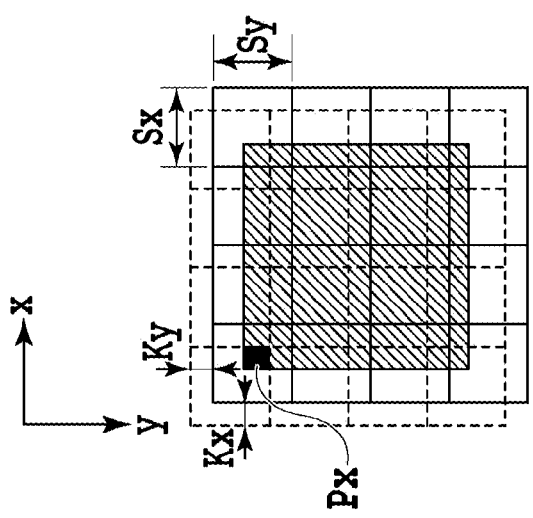

FIGS. 11A to 11C are diagrams for explaining a method for generating dummy data. In the diagrams, an area corresponding to the inspection target image data is indicated as a shaded area. As illustrated in FIG. 11A, if a target pixel Px indicated in black is positioned at a corner of an inspection target area, both of a division area (solid line) around the target pixel Px, and a division area (dashed line) whose phase has been shifted from the division area (solid line) include areas (white areas) where no data is present. For this reason, in this example, dummy data is generated such that even when the maximum division size and the maximum shift distance are employed with respect to the target pixel Px, appropriate data is present in any pixel included in any division area.

FIG. 11B is a diagram illustrating the method for generating dummy data. Four images obtained by inverting inspection target image data point-symmetrically with respect to apices A, B, C, and D, respectively, and four images obtained by inverting the inspection target image data line-symmetrically with respect to sides AB, BD, CD, and AC, respectively, are generated, and these eight images surround the inspection target image data. Note that the maximum division size and the maximum shift distance in the defect detection algorithm are represented by (Sxm, Sym) and (Kxm, and Kym), respectively. In this case, the dummy data is only required to be generated in an area that is extended from the four edges of the inspection target image data by Fp={(Sxm/2)+Kxm} in the x direction and by Fq={(Sym/2)+Kym} in the y direction. FIG. 11C illustrates the inspection target image data that is added with the dummy data in this manner.

As a sixth embodiment, which will be described later, when inspection target image data is generated using the Gaussian filter, Fp and Fq defining the size of dummy data are given as Fp=INT(Fxm/2), and Fq=INT(Fym/2). Here, Fxm and Fym represent x and y components, respectively, of the maximum Gaussian filter size F used in the defect detection algorithm.

When the defect portion extraction process is performed on a portion of print image data, in some cases dummy data may not be added to the inspection target image data. If a target pixel is not positioned in an edge part of the print image data, dummy data may not be generated.

Information on a defect portion (unique portion) extracted in accordance with the above algorithm can be used later for various applications. For example, in defect inspection of an image acquired by photographing a product, the extracted defect portion can be displayed as a popup in order to make the defect portion easily determinable by an inspector. In this case, the inspector can check the defect portion on the basis of the image displayed as a popup, and repair a product corresponding to defect portion or eliminate such a product as a defective product. Such an image defect inspection is considered to be performed in order to inspect a print state of a printing apparatus when the printing apparatus is developed, manufactured, or used. The information on the defect portion can also be stored for use in another system. Further, a device having a self-correcting function of a defect to a normal state can be configured to be able to use the information on the defect portion for a correction process. For example, when an area where the luminance is higher or lower as compared with surrounding areas is extracted, an image processing parameter for correction can be prepared for the area. In addition, it is also possible to detect whether or not ejection failure occurs in the inkjet printing apparatus, and perform a maintenance action on the print head for a printing element at a relevant position.

In any case, since with the above defect detection algorithm a defect portion is extracted on the basis of adding results obtained by variously changing the division size and the phase, a substantial defect can be made apparent while appropriately suppressing noise caused by each read pixel.

The present inventors have found, as the results of earnest examination, that if the features of an inspection target unique portion such as a defect is clear, it is effective to adjust a division size and a phase in reading an inspection image according to the features of the unique portion in the above defect detection algorithm. In other words, if a division size and a phase are not set to be in a suitable range, it is possible that a unique portion such as a defect cannot be effectively detected, or that a load and time for the process of extracting a unique portion is unnecessarily increased. For this reason, in this embodiment, taking into consideration the features of an inspection target unique portion, a division size and phase are set according to the features of the unique portion in Step S3 of the flowchart in FIG. 5. In the following, the relation between the features of a defect to be inspected in this embodiment and a division size and a phase suitable for the features will be specifically described.

Figures 12A, 12C, 12E:
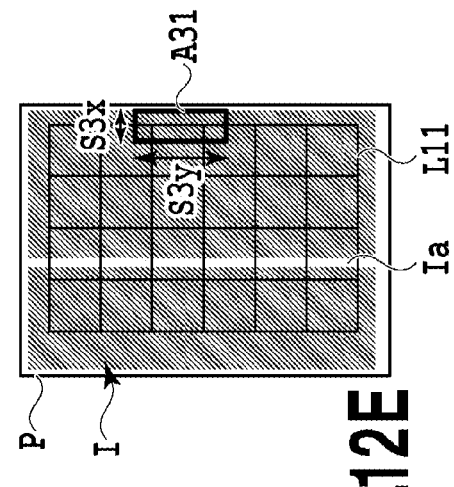
FIGS. 12A to 12F are diagrams for explaining the relation between print images and division areas.
Figures 12B, 12D, 12F:
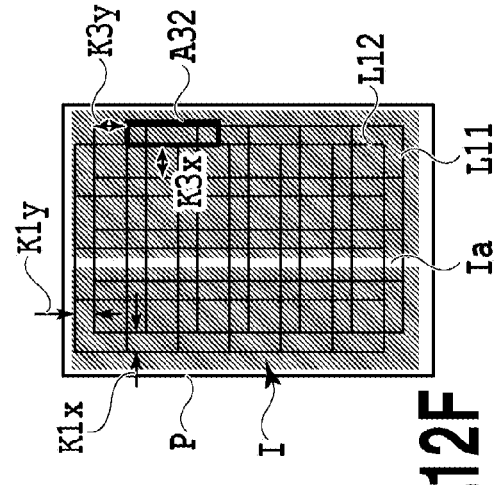

FIGS. 12A to 12F illustrate an inspection target image I printed on the sheet P. The image I is printed serially in the arrow y direction by a relative movement of the print head 100 and the sheet P. A stripe-like defect appears in an area Ia within the image I due to ink ejection failure of a printing element in the print head 100. The area Ia looks like a belt-like white stripe extending in the conveyance direction (arrow y direction) of the sheet P because of a lower print density of the area Ia caused by ejection failure of the printing element. In FIG. 12A, the image I is divided by border lines L11 into division areas A11 having a division size S1 (S1$x$, S1$y$). One of the division areas A11 is depicted by thick solid lines. FIG. 12B illustrates division areas A12 shifted by a pixel-unit shift amount K1 (K1$x$, K1$y$) from the division areas A11 in FIG. 12A, in which these division areas A12 are divided by border lines L12. One of the division areas A12 is depicted by thick solid lines. The shift amount K1$x$ is a shift amount in the x direction, and the shift amount K1$y$ is a shift amount in the y direction.

FIG. 12C illustrates division areas A21 having a division size S2 (S2$x$, S2$y$) different from the size of division area A11 in FIG. 12A, in which these division areas A21 are divided by border lines L21. One of the division areas A21 is depicted by thick solid lines. The relation of the division size S2$x$ and S2$y$ is S2$x$<S2$y$. FIG. 12D illustrates division areas A22 shifted from the division areas A21 in FIG. 12C by a pixel-unit shift amount K2 (K2$x$, K2$y$), in which these division areas A22 are divided by border lines L22. One of the division areas A22 is depicted by thick solid lines. The shift amount Kx is a shift amount in the x direction, and the shift amount Ky is a shift amount in the y direction.

For example, when a division size ($S_{x1}$, $S_{y1}$) is set from Expression 1, two times of changes of the division size can process an area twice the size of an area of two times before.

$$(S_{xn+1}, S_{yn+1}) = (\sqrt{2} \cdot S_{xn}, \sqrt{2} \cdot S_{yn}) \quad n=0,1,2 \qquad \text{Expression 1}$$

In addition, a division size may be enlarged by one and half times. A change amount in size in the X direction may be different from a change amount in size in the Y direction.

A division size S (Sx, Sy) of a division area can be preferably set according to the extending direction of a defective portion (unique portion) in an inspection target image. In the following, a method for setting such a division size will be described.

In a full-line type inkjet printing apparatus as in this example, for example, if an image defect occurs due to ink ejection failure caused by nozzle clogging, occurrence of the image defect can be estimated from the size of dots formed by ejected ink. However, in the case of the insufficient ink bubbling due to air bubbles inside a print head and the ejection failure due to pressure loss, it cannot be found which nozzle has ejection failure causing an image defect. As just described, even if a cause of an image defect we want to detect is known, a size of the image defect cannot be specified. However, for an image defect caused by an inkjet print head, its detection accuracy can be improved by utilizing the characteristic that the image defect occurs continuously in the direction of relative movement of the print head and print medium.

Figure 13:
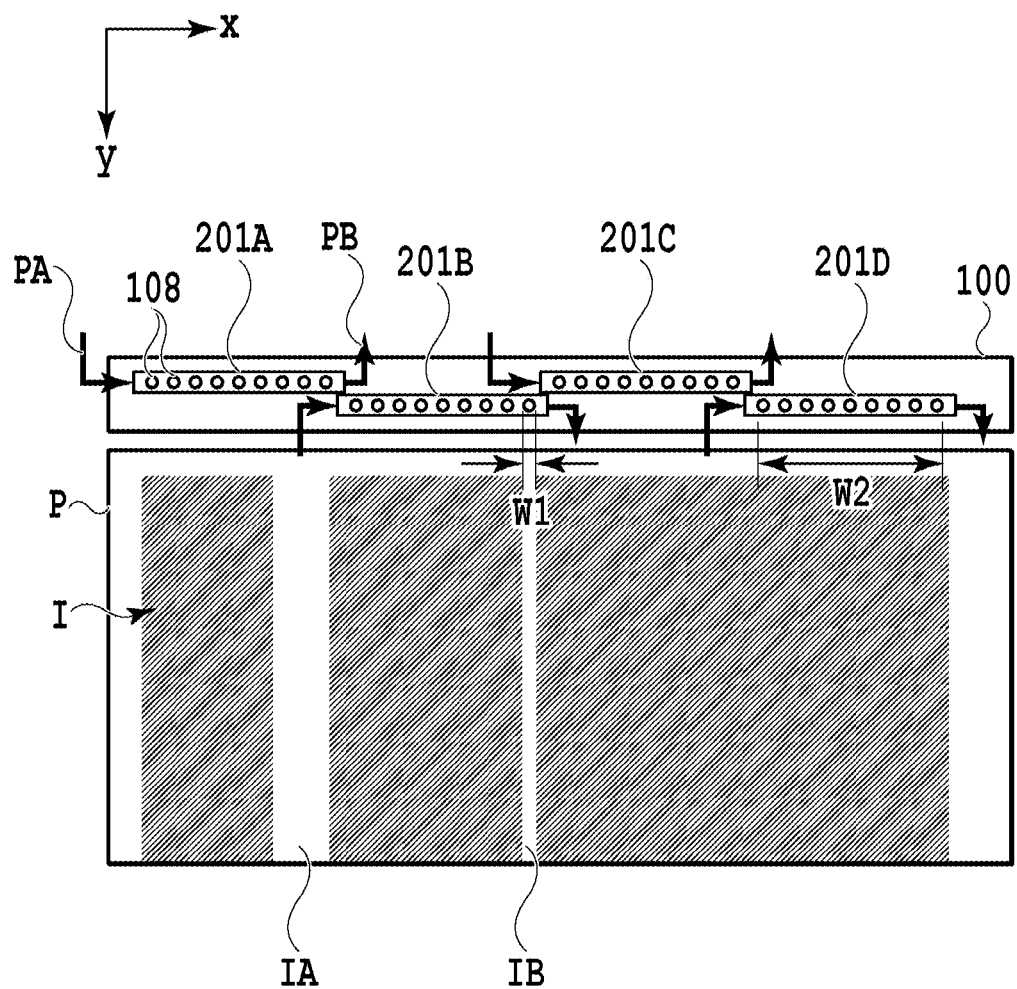
FIG. 13 is a diagram for explaining a stripe-like defect appearing in a print image.

An example of an image defect appearing with directionality includes a stripe-like defect due to ink ejection failure of a nozzle in the print head 100, as illustrated in FIG. 13. To multiple nozzles (printing elements) 108 of printing element substrates 201A to 201D, ink is supplied from an ink tank through a flow path PA at one side of the nozzles, and unused ink is returned to the ink tank through a flow PB at the other side of the nozzles. In ink, air bubbles may occur due to surfactant added to the ink. If air bubbles occurring inside ink reside near a nozzle, pressure for ejecting ink is absorbed by the air bubbles, which may leads to ink ejection failure. In a full-line type printing apparatus as this example, such ink ejection failure in a nozzle causes white stripes IA, IB as stripe-like defects to appear in the print image I. If ink ejection failure occurs in one nozzle, a thin white stripe IB appears. If ink ejection failure occurs in three nozzles, a thick white stripe IA appears. These white stripes IA, IB appear with directionality so as to extend in the conveyance direction (arrow y direction) of the sheet P. In this way, in the full-line type printing apparatus, the extending directions of the white stripes IA, IB can be found, but their sizes (widths in the x direction) cannot be specified.

Since a size of the stripe-like defect cannot be specified, division areas in FIGS. 12A to 12D need to be set so as to encompass a stripe-like defect that can occur. For this reason, if images having different division sizes are generated and phases of these division areas are changed, a processing load problem of data throughput increase occurs and the detection accuracy is also affected. For example, if a division size is set to be half of the division size S1 (S1$x$, S1$y$) of the division areas A11 in FIG. 12A, then the detection accuracy of a thin-width stripe-like defect such as the white stripe IB is improved but becomes more vulnerable to noise of an input image. That is, if a division size is simply decreased, the detection accuracy becomes more affected by noise.

A detection unit such as the read head 107 uses a light-receiving element to convert light from an inspection target image to an electric signal. Random noise, such as light shot noise caused by the light-receiving element receiving discrete photons and noise caused by a dark current in an electric circuit, can be reduced by the above addition process of quantized data. Accordingly, it is desirable to change an aspect ratio of a division area according to the extending direction of a defective portion (unique portion) in the image without changing an area of the division area.

Specifically, comparing the division area A11 in FIG. 12A and the division area A21 in FIG. 12C, they have the same area. However, a stripe-like defect appearing in the area Ia affects more to an average value of luminance of pixels in the division areas A21 than to an average value of luminance of pixels in the division areas A11. That is, a difference in luminance of the stripe-like defects reflects more easily to the average value of luminance in the division areas A21. As a result, a signal-to-noise ratio of a read signal of an inspection target image and a detection sensitivity of a stripe-like defect can be improved.

That is, it is effective that a division size S (Sx, Sy) is set to Sx<Sy. Specifically, it is assumed that a white stripe having a width of about 300 μm appears due to non-ejection of ink in about three nozzles, and an image containing such a white stripe is read with a resolution of 600 dpi. In this case, the white stripe cannot be detected in a division area whose division size is (Sx, Sy)=(10, 10) while the white stripe can be detected in a division area whose division size is (Sx, Sy)=(7, 14) and having the same area.

Further, based on FIGS. 12B and 12D, a shift direction of division areas will be described. The case where a shift amount K1x is equal to a shift amount K1y in FIG. 12B and the case where a shift amount K2x is equal to a shift amount K2y in FIG. 12D are assumed. In these cases, since a stripe-like defect appearing in the area Ia extends in the arrow y direction, then a change in an average value of luminance within the division area along with the shift in the arrow x direction increases and a change in an average value of luminance within the division area along with the shift in the arrow y direction decreases. Accordingly, a shift amount Ky in the arrow y direction is made to be bigger relative to a shift amount Kx in the arrow x direction thereby to increase a change amount of an average value of luminance, which can improve the detection accuracy. That is, it is effective to set the shift amount K (Kx, Ky) to be Kx<Ky.

An effect of setting a division size to be Sx<Sy and an effect of setting a shift amount to be Kx<Ky are independent from each other. Accordingly, if a stripe-like image defect appears due to ink ejection failure caused by air bubbles inside a print head and the inspection target image defect has the directionality of extending in the y direction, either condition of Sx<Sy or Kx<Ky may be satisfied.

A cause of non-ejection of ink is not limited to air bubbles in ink. For example, a cause of non-ejection of ink may be due to thickening of ink, defective voltages of power sources for supplying electric signals to a print head, or scorching of an electrothermal transducer (heater) as an ejection energy generating element. It is difficult to specify a size of an image defect due to such non-ejection of ink, but such an image defect tends to appear continuously in the arrow y direction in a full-line type printing apparatus. Accordingly, by setting a division size and shift amount as described above, an image defect can be accurately detected.

In addition, if a cause of ink ejection failure is specified, a division size and shift amount may be set as follows.

Ink ejection failure due to air bubbles inside a print head occurs in one nozzle basis. For this reason, the minimum width of a stripe-like defect due to such ejection failure is a width W1 of one dot as the white stripe IB in FIG. 13. Therefore, the division size Sx in the x direction may be more than or equal to half of this width W1 (Sx≥(W1/2)). The maximum width of a stripe-like defect due to such ejection failure is a width W2 matching a length of a nozzle array in the printing element substrate (head chip) 201 as in FIG. 13. That is because if air bubbles inside ink grow and ink cannot normally be supplied to a nozzle array in the printing element substrate 201, non-ejection of ink may occur in all nozzles composing the nozzle array. Accordingly, if ink ejection failure is caused by air bubbles in this manner, a division size may be set to Sx<Sy and W2≥Sx≥(W1/2).

A cause of non-ejection of ink may be a defect of a power supply voltage to be supplied to a drive circuit of a print head. In a higher drive frequency of printing elements, a problem about a circuit resistance of a power supply circuit connected to a large number of printing elements occurs, and therefore the power supply circuit for the printing element substrate 201 may be divided on multiple printing elements (several nozzles) basis. In this case, the minimum width W3 of a stripe-like defect due to ejection failure matches a width of multiple printing elements connected to one power supply circuit. If a defect occurs in a power supply voltage of a supply circuit in common connected to the divided power supply circuit, the maximum width of a stripe-like defect due to ejection failure is the width W2 matching a printing element array (nozzle array) in the printing element substrate 201 as illustrated in FIG. 13. Accordingly, if a cause of ink ejection failure is a defective power supply voltage as just described, a division size may be set to Sx<Sy and W2≥Sx≥W3.

FIGS. 12E and 12F are diagrams for explaining a detection method of an image defective portion (unique portion) at an end part of the print image I.

In inspecting an end part of the image I, if luminance values of pixels within a division area A31 including pixel data outside the image I are averaged, the detection accuracy of an image defective portion is reduced. For this reason, for example, in an area not beyond the end part of the image I, division areas A11 and A12 and a shift amount K1 (K1x, K1y) are used as illustrated in FIGS. 12A and 12B while in an area where the division areas A11 and A12 extend beyond an end part of the image, division areas A31 and A32 and a shift amount K3 (K3x, K3y) are used as illustrated in FIGS. 12E and 12F. That is, the division areas A21 and A32 are limited so as not to extend beyond an end part of the image I. Specifically, the division size S (Sx, Sy) of these areas is set to Sy≥Sx. This can suppress the reduction of detection accuracy of an image defective portion.

Further, because an image defective portion existing in an end part in the arrow y direction of the image I is expected to be continuous in the arrow y direction, the end part in the y direction may be masked, or processed as with an end part in the arrow x direction. Further, division areas having a division size of Sy>Sx may be used for the whole part of the image I, or division areas having a division size of Sy>Sx may be used for only a specific area of the image I. The division size S3y may be the same as S1y (S3y=S1y). In order to maintain the detection accuracy of an image defective portion, it is desirable to set S3y such that an area of the division area A31 (S3x×S3y) equals to an area of the division area A11 (S1x×S1y). And, a shift amount K is set such that a division area does not extend beyond an end part of the image I. For this purpose, a shift amount K may be set to Ky>Kx in the whole part of the image I, or as illustrated in FIG. 12F a shift amount K may be set to Ky>Kx in a specific part in the image I. In at least one area of the inspection target image I, at least one of (i) relation of Sy>Sx in a division size S and (ii) relation of Ky>Kx in a shift amount K may be satisfied.

Second Embodiment

An inspection target image defect is not limited to a defect due to ink ejection failure. In an inkjet printing apparatus, density unevenness may appear as an image defect in a print image due to various causes of ink ejection characteristics in the print head.

Figure 14:
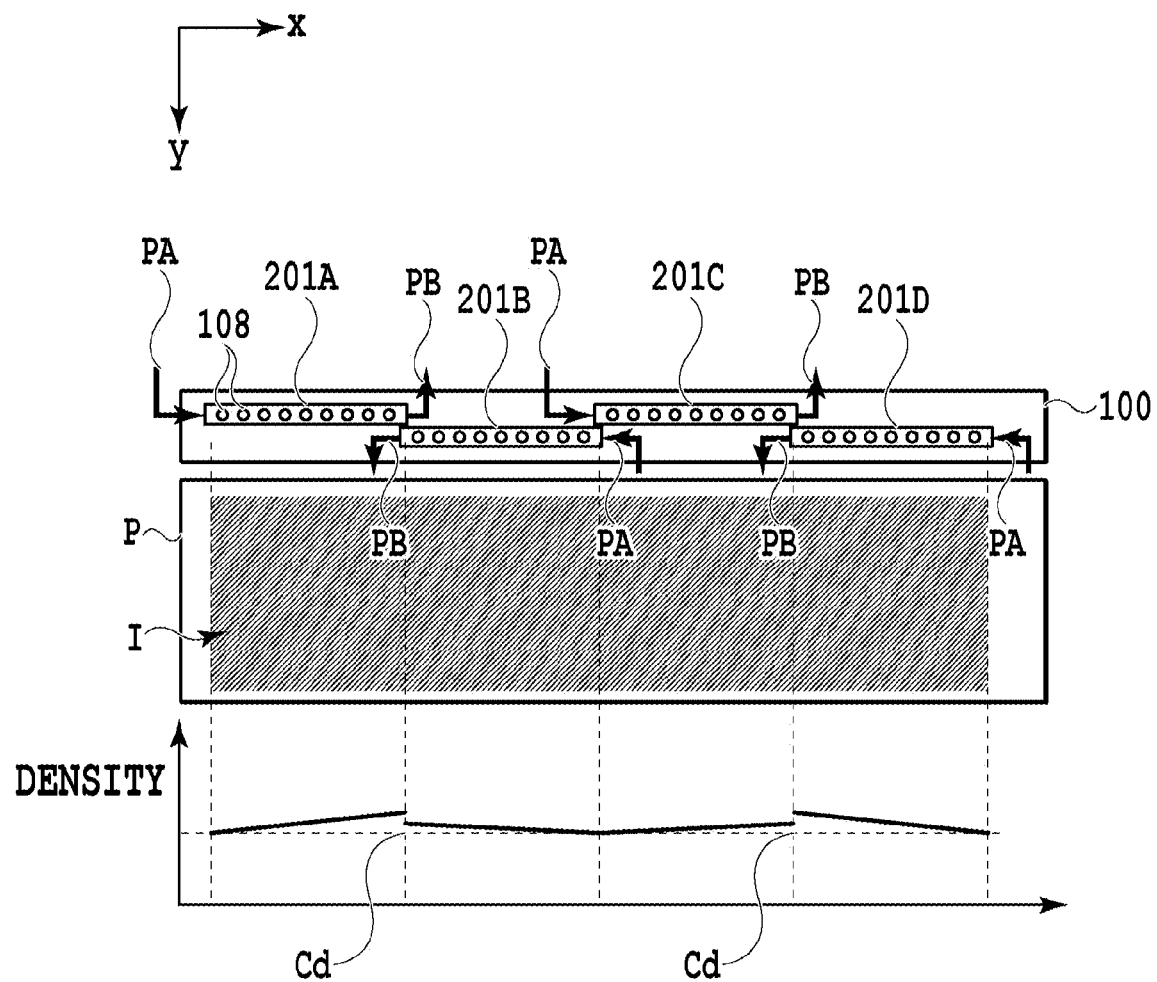
FIG. 14 is a diagram for explaining density unevenness appearing in a print image.

For example, in the ink supply path described with FIG. 13, if evaporation of a solvent component in ink increases an ink density, the tendency of increase of the ink density becomes higher towards downward in the ink supply path. Since ink ejected from a nozzle downward in the ink supply path has a higher density, a print image has a difference in density. Because ink is normally ejected before evaporation of solvent changes an ink density, an image defect is unlikely to occur. However, in some print images, the state where a nozzle does not eject ink continues and the ink density continues to increase. In such a case, a print density may change between printing element substrates where their ink supply paths are changed. FIG. 14 illustrates a configuration where in order to reduce a change in print density, positions of flow paths PA and PB are alternately reversed in printing element substrates adjacent to each other. However, even in such a configuration, a difference Cd in print density may occur.

Although an extending direction of such an image defect can be specified to the arrow y direction, a size of the image defect (width in the arrow x direction) cannot be specified. In such a case, a division size may be set to $Sx<Sy$ and $Sx \leq W3$. W3 is the maximum width in the arrow x direction of an image defect due to a change in ink density, and varies depending on the characteristics of the ink supply path.

FIGS. 15A and 15B are diagrams for explaining image density unevenness due to non-uniformity of ink landing positions (dot formation positions). As illustrated in FIG. 15A, when a relative positional relation between nozzles (printing elements) 108 on the printing element substrate 201 and dots D formed on the sheet P is maintained, an image having uniform density is printed. If an ink ejection speed and direction change due to a factor such as scorching of an electrothermal transducer as an ejection energy generating element or a change in wettability of an ejection port forming surface on which ink ejection ports are formed, then ink landing positions deviate as illustrated in FIG. 15B. If the landing positions of ink ejected from a nozzle 108A deviate in the arrow y direction to form dots DA, the coverage of the dots DA on the sheet P does not change. However, if landing positions ink ejected from a nozzle 108B deviate in the arrow x direction to form dots DB, the coverage of the dots DB on the sheet P changes to cause a density difference, which leads to appearance of a stripe-like density unevenness extending in the arrow y direction.

Although an extending direction of an image defect due to such density unevenness can be specified to the arrow y direction, a size of the image defect (width of the arrow x direction) cannot be specified. In this case, a division size may be set to $Sx<Sy$ and $W4 \geq Sx$. W4 is the lower limit of a width in the arrow x direction to which when positions of dots are deviated to cause a coverage change, the change can be visually recognized.

Density unevenness in a print image also occurs due to non-uniformity of dot size caused by a change in ink ejection amount. When uniformity of dot size is maintained as illustrated in FIG. 15A, the density of the print image is uniform. If there is a change in scorching of a electrothermal transducer (heater) as an ejection energy generating element, temperatures of ink and the heater, an ink viscosity, or wettability of an ejection port forming surface, then an ink ejection amount changes. In this case, a dot coverage on the sheet and dot density also change, and therefore density unevenness occurs in the print image. Such density uneven-ness does not occur in the arrow y direction but occurs in the x direction within a short time.

Although an extending direction of an image defect due to such density unevenness can be specified to the arrow y direction, a size of the image defect (width of the arrow x direction) cannot be specified. In this case, a division size may be set to $Sx<Sy$ and $W5 \geq Sx$. W5 is the lower limit of a width in the arrow x direction to which when positions of dots are deviated to cause a coverage change, the change can be visually recognized. Further, adjustment of ink ejection characteristics of a nozzle is performed on a printing element substrate (head chip) 201 basis, a size (nozzle chip size) W6 in the arrow x direction of the printing element substrate (head chip) 201 may be set to be the maximum value of Sx and $W5 \leq Sx \geq W6$.

Third Embodiment

Figure 16A:
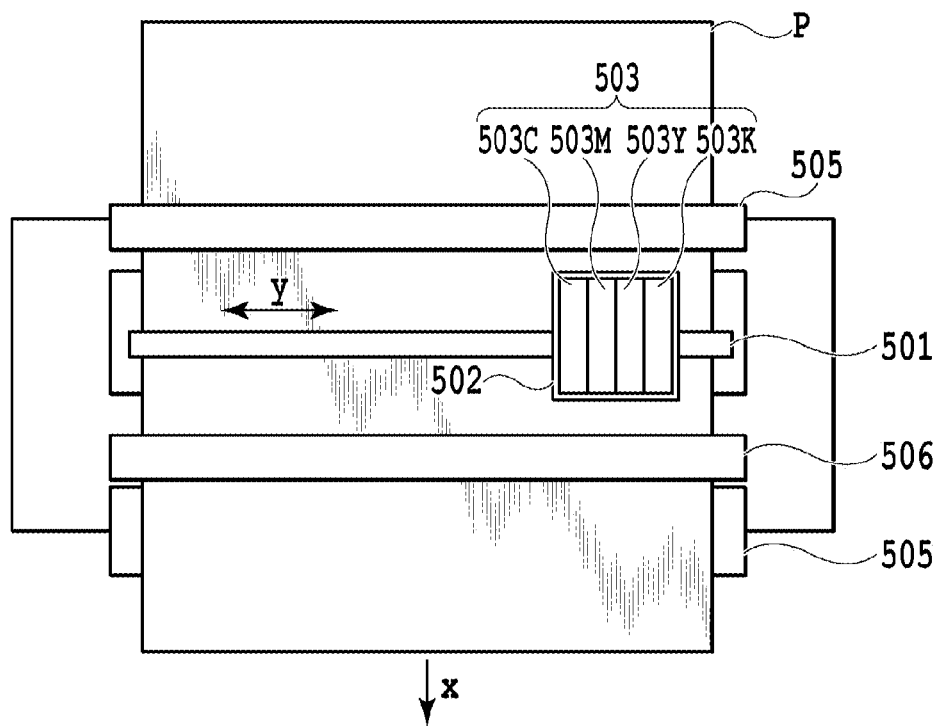
FIGS. 16A and 16B are diagrams for explaining an inkjet printing apparatus according to a third embodiment of the present invention.
Figure 16B:
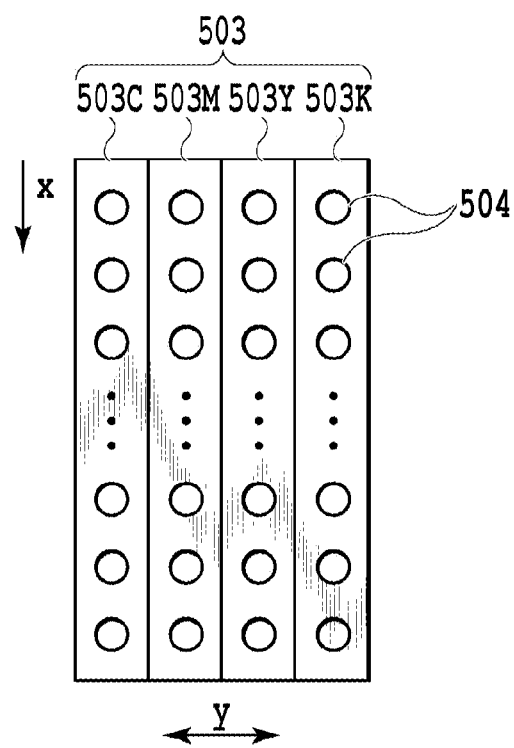

The printing apparatus in this embodiment is a full-multi type inkjet printing apparatus as illustrated in FIG. 16A. This printing apparatus includes a carriage 502 capable of moving in a main scanning direction indicated by the arrow y along a guide shaft 502, and an inkjet print head 503 is mounted on the carriage 502. The print head 503 includes four print heads 503C, 503M, 503Y and 503K that eject cyan (C), magenta (M), yellow (Y) and black (K) inks respectively as illustrated in FIG. 16B. On each of the print heads, multiple nozzles (printing elements) 504 for ejecting ink are arrayed so as to form a nozzle array (a printing element array). These nozzle arrays extend in a direction crossing (in this example, orthogonal to) the main scanning direction (arrow x direction). In this example, the nozzles 504 are arrayed so as to form one nozzle array. The number and form of arrangement of the nozzles 504, however, are not limited to this. For example, a configuration including a nozzle array having a same color and different ink ejection amounts, a configuration in which nozzle arrays having a same ink ejection amount form multiple nozzle arrays, or a configuration in which nozzles are arranged in a zigzag manner as the above embodiment may be employed. Further, on one print head may be formed a nozzle array capable of ejecting different inks. Nozzles are configured to eject ink from ejection ports by using an ejection energy generating element. As the ejection energy generating element can be used an electrothermal transducer (heater) or a piezoelectric element, for example.

The sheet P as a print medium is conveyed in a sub-scanning direction (conveyance direction) indicated by the arrow x by an unillustrated conveyance motor rotating a conveyance roller 505 and another unillustrated roller. A print scan in which the print head 503 ejects ink while moving with the carriage 502 in the main scanning direction and a conveyance action in which the sheet P is conveyed in the sub-scanning direction are repeated, thereby printing an image on the sheet P.

A reading sensor (scanner) 506 reads an inspection target image printed on the sheet P, and multiple reading elements are arrayed at a predetermined pitch in the arrow y direction thereon. The reading sensor 506 generates image data corresponding to a read resolution on the basis of output signals from the reading elements. The image data is luminance signals of R (red), G (green), and B (blue).

If an inspection target image defect is due to ink ejection failure or due to air bubbles inside a print head, a stripe-like defect (unique portion) appears as an image defect in the image I as with FIGS. 12A to 12F of the above embodiments. The arrow x direction in FIGS. 12A to 12F corresponds to the array direction of nozzle arrays of the print head in FIGS. 16A and 16B (in this example, sub-scanning direction), and the arrow y direction in FIGS. 12A to 12F corresponds to the scanning direction (main scanning direction) of the print head in FIGS. 16A and 16B. Although an extending direction of such an image defect can be specified to the arrow y direction, a size of the image defect (width of the arrow x direction) cannot be specified. Accordingly, as with the above embodiment, by setting a division size S to Sx<Sy, the detection accuracy of an image defective portion can be improved.

Further, a shift amount K can be set as with FIGS. 12A to 12F in the above embodiment. As described above, when a stripe-like defect occurs, an average value of luminance of pixels within a division area changes less by a shift Ky in the y direction in which the stripe-like defects extends, and changes more by a shift Kx in the x direction. For this reason, by setting a shift amount in the x direction smaller than a shift amount in the y direction, that is, by setting a shift amount K to Kx<Ky, the detection accuracy of the stripe-like defect can be improved.

An effect by setting a division size S to be Sx<Sy and an effect by setting a shift amount K to be Kx<Ky can be generated independently. Accordingly, when an inspection target unique portion has the directionality of extending in the y direction, the detection accuracy can be improved by satisfying at least one of Sx<Sy and Kx<Ky.

Further, a size of a stripe-like image defective portion (unique portion) to be detected may be designated via a user interface (UI). For example, if the minimum size, Lmin and the maximum size, Lmax in the x direction of the image defective portion are designated, then Kx<Ky and Lmax≥Sx≥Lmin. By changing a size of a target area on the basis of a user instruction in this way, the detection accuracy of an image defective portion can be achieved by reflecting user's intention.

Further, detection target image data may be read by a scanner provided in a printing apparatus or may be read by a scanner outside the printing apparatus as long as detection target image data may be acquired. Further, an inspection image may be a test pattern for detecting various image defects or an image (actual image) desired by a user. In the case of an actual image, it is desirable to perform pre-processing necessary for distinguishing between an image defect and content to be printed.

Fourth Embodiment

In the above first embodiment, as described with the flowchart in FIG. 6, the process is performed for finding an addition result of average values for multiple phases corresponding to a division size. By such a process, as described with FIGS. 9E and 10J, a final result is similar to that obtained by performing a filtering process with the target pixel as the center. In consideration of such a respect, this embodiment is adapted to replace the addition process for multiple phases corresponding to one division size by an addition process of weighting coefficients using a Gaussian filter. Other configurations are the same as the above embodiment, and will not be described here.

Figure 17A:
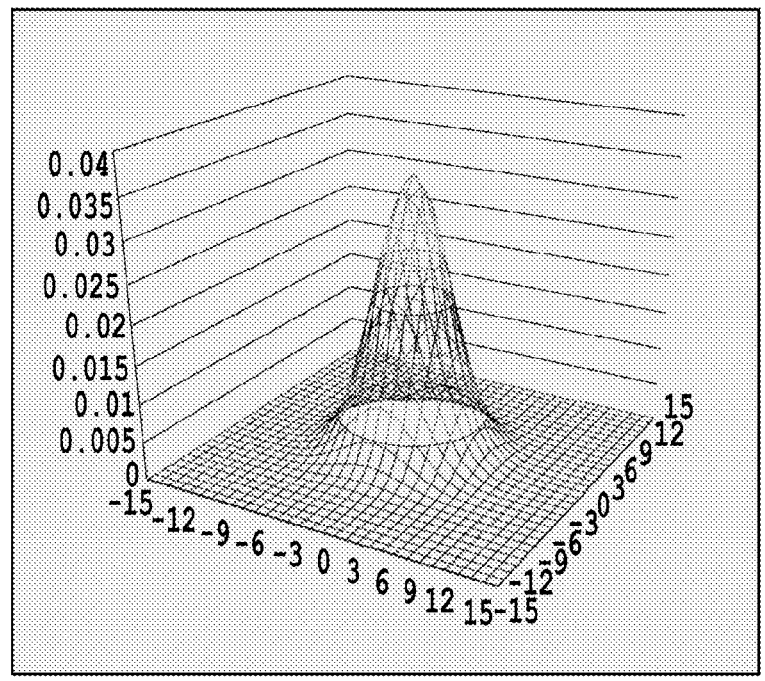
FIGS. 17A and 17B are diagrams for explaining Gaussian filters according to a fourth embodiment of the present invention.
Figure 17B:
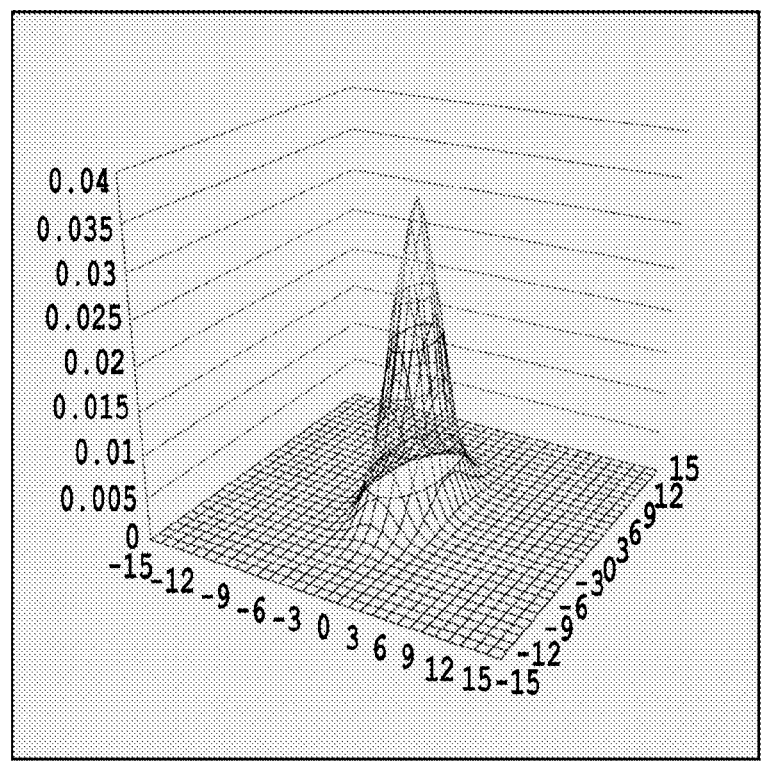

FIGS. 17A and 17B are diagrams illustrating examples of Gaussian filters. FIG. 17A illustrates an isotropic Gaussian filter, which can be expressed by Expression 2.

$$f(x, y) = \frac{1}{2\pi\sigma^2} \exp\left(-\frac{x^2 - y^2}{2\sigma^2}\right) \quad \text{Expression 2}$$

Here, σ represents a standard deviation.

Such an isotropic Gaussian filter corresponds to the case of using a square division size such as 2×2 or 3×3. On the other hand, FIG. 17B illustrates an anisotropic Gaussian filter, and corresponds to the case of using a rectangular division size such as 2×3 or 3×2. Such an anisotropic Gaussian filter can be generated by deviating the ratio between x and y in Expression 2. For example, the Gaussian filter in FIG. 17B is represented by replacing y in Expression 2 by x'=x/2. This embodiment, as illustrated in FIG. 17B, employs an anisotropic Gaussian filter having a long side in the y direction. By matching the direction of this long-side axis to the direction in which an inspection target density unevenness extends, the same result can be obtained as the case where the division size and phase are set as in the above embodiment.

In this embodiment, luminance data of a target pixel is filtered using one Gaussian filter and quantized thereby to obtain a result. This process is performed for multiple different sized Gaussian filters, and the results are added. By doing so, an image defect extraction process can be performed on the basis of an addition result equivalent to that in the first embodiment.

Figure 18:
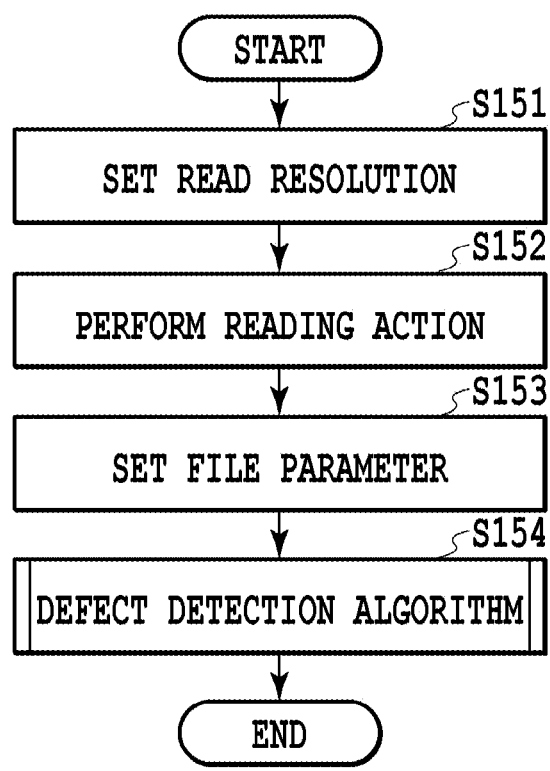
FIG. 18 is a flowchart illustrating the basic steps of defect detection according to the fourth embodiment of the present invention.

In this embodiment as well, the image processing apparatus 1 can take various forms as described with FIGS. 1A to 1D. FIG. 18 is a basic flowchart of a defect detection algorithm performed by the image processing apparatus 1 in this embodiment. When this process is started, in Step S151 the image processing apparatus 1 sets a read resolution and in subsequent Step S152 a reading action is performed on an inspection target. The above Steps S151 and S152 are equivalent to Step S1 and Step S2 in FIG. 5.

In Step S153, the CPU 301 sets multiple types of file parameters of the Gaussian filter to be used for the defect extraction process performed in subsequent Step S154. The file parameters define the directionality of a Gaussian function as described with FIGS. 17A and 17B, and a different filter size (Gaussian filter diameter) F. Here, the file parameters are set such that the Gaussian filter is anisotropic. Then in Step S154, on the basis of the file parameters set in Step S153, the predetermined defect detection algorithm is performed on the image data generated in Step S152.

Figure 19:
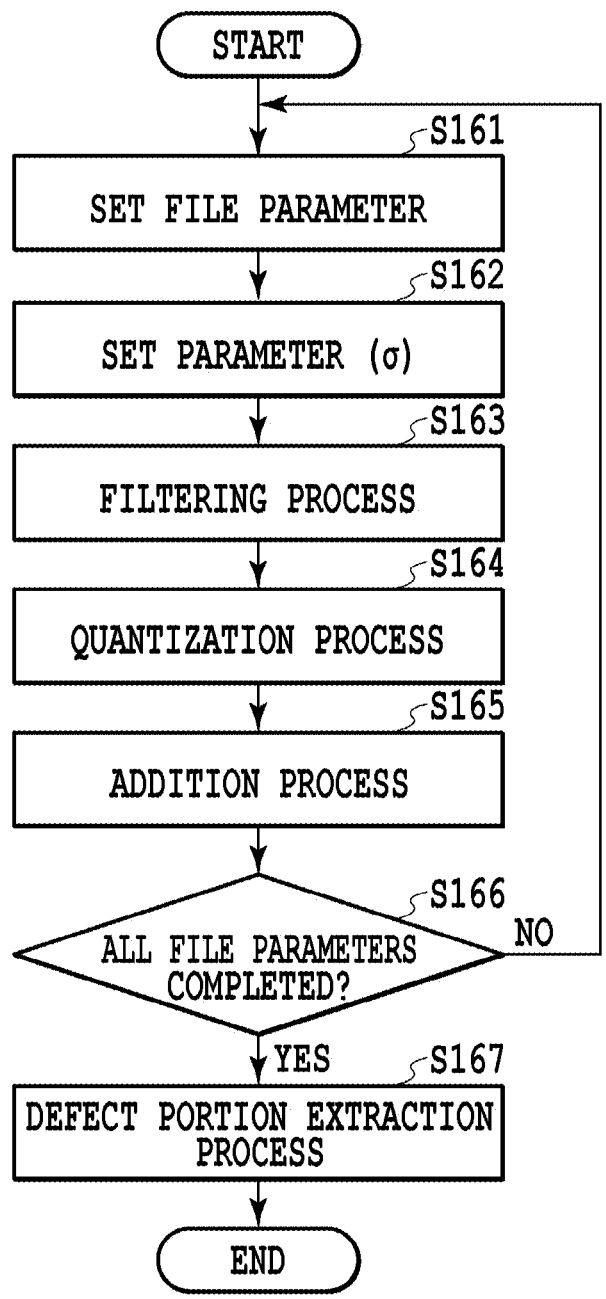
FIG. 19 is a flowchart illustrating a defect detection algorithm according to the fourth embodiment of the present invention.

FIG. 19 is a flowchart for explaining the steps of the defect detection algorithm performed by the CPU 301 in Step S154. The process illustrated here is performed one-by-one on pixels in the image acquired in Step S152.

When this process is started, in Step S161 the CPU 301 first sets one file parameter from the multiple file parameters set in Step S153. Further, in Step S162 the CPU 301 sets a parameter σ corresponding to the file parameter set in Step S161. The parameter σ corresponds to the standard deviation of a Gaussian function, and is preliminarily stored in a memory in association with a file parameter and a filter size. Setting the file parameter and the parameter σ in Steps S161 and S162 determines the shape of a Gaussian filter.

In subsequent Step S163, the Gaussian filter set in Steps S161 and S162 is used to perform a filtering process on the image data acquired in Step S152. Specifically, respective pieces of luminance data of the target pixel and its neighboring pixels falling within the filter size F are multiplied by a coefficient determined by the Gaussian filter, and the sum of the pieces of luminance data multiplied by the coefficient are calculated as a filtering process value for the target pixel.

In Step S164, a quantization process is performed on the filtering process value obtained in Step S163, and further, in Step S165, a quantized value obtained in Step S164 is added to addition image data. The addition image data refers to image data for obtaining a result of adding pieces of quantized data obtained when variously changing the file parameters, i.e., variously changing the type of a Gaussian filter. If the quantized data obtained in Step S164 is a result for the first Gaussian filter, the addition image data is the same as the quantized data obtained in Step S164.

In subsequent Step S166, the image processing apparatus 1 determines whether or not all the file parameters set in Step S153 have been processed. If the image processing apparatus 1 determines that a file parameter to be processed still remains, the flow returns to Step S161 where the next file parameter is set. On the contrary if the image processing apparatus 1 determines that all the file parameters have been processed, the flow proceeds to Step S167.

In Step S167, on the basis of currently obtained addition image data, the defect portion extraction process is performed. An extraction method is not particularly limited as in the first embodiment. This process ends here.

As with the above embodiment, this embodiment also ensures that density unevenness appearing as a white stripe can be extracted. When the filter size is too large, then a luminance value after a filtering process is not sufficiently high even if a target pixel is within a white stripe, and therefore a defect portion cannot be extracted. For this reason, in this embodiment, the filter size F is provided with a maximum value Fmax and a minimum value Fmin, and in Step S153 only a filter size between Fmax and Fmin is set.

As described above, in this embodiment, in Step S153 in FIG. 18, a file parameter is set such that the Gaussian filter is anisotropic as illustrated in FIG. 17B. This enables a stripe-like defect in the image to be efficiently extracted. As such an anisotropic filter, a low pass filter or a Gabor filter can be employed besides the Gaussian filter.

Other Embodiments

An inspection target image is not limited to an image printed using an inkjet print head, and any printing method can be used as long as an image is printed serially from one side to the other side of the image. Any reading method of such an image is also employed. In short, any method for reading the image printed in this way also can be employed as long as image data resulting from reading the image printed serially in one direction (in the above embodiment, the arrow y direction) can be obtained.

The present invention can also be achieved by a process adapted to supply a program realizing one or more functions of the above embodiments to a system or an apparatus through a network or a storage medium and to cause one or more processors in the system or apparatus to read and perform the program. In addition, the present invention can also be achieved by a circuit (e.g., an ASIC) realizing the one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132828 filed Jul. 1, 2015, which is hereby incorporated by reference wherein in its entirety.

What is claimed is:

1. An image processing apparatus comprising a processor executing a program to function as:
    an acquisition unit configured to acquire image data resulting from reading an image printed sequentially in a first direction;
    a setting unit configured to set a division size in the first direction and a second direction of a division area for dividing the image data, the second direction crossing the first direction, as well as a shift amount in the first direction and the second direction of the division area;
    a processing unit configured to perform a predetermined process including an averaging process on the image data according to the division size and the shift amount, a quantization process for quantizing a value obtained by performing the averaging process on image data in each division area shifted in accordance with the shift amount, and an addition process for adding values obtained by the quantization process; and
    an extraction unit configured to extract a unique portion from image data on which the predetermined process has been performed;
    wherein the setting unit sets
    (i) the division size greater in the first direction than in the second direction; and/or
    (ii) the shift amount greater in the first direction than in the second direction.

2. The image processing apparatus according to claim 1, wherein
    the setting unit sets multiple types of the division sizes, and
    the predetermined process includes a process of further adding results of the addition process for each of the division areas corresponding to the multiple types of the division sizes.

3. The image processing apparatus according to claim 1, wherein
    the setting unit sets at least one of an upper limit and a lower limit of the division size in the second direction.

4. The image processing apparatus according to claim 1, wherein
    the image is printed on a print medium along with a relative movement in the first direction of the print medium and a print head on which multiple printing elements are arrayed in the second direction.

5. The image processing apparatus according to claim 4, wherein
the printing elements are nozzles capable of ejecting ink.

6. A printing apparatus comprising:
an image processing apparatus;
a printing unit configured to print an image; and
a reading unit configured to read the image printed by the printing unit thereby to generate image data, the image processing apparatus comprising a processor executing a program to function as:
an acquisition unit configured to acquire image data resulting from reading an image printed sequentially in a first direction;
a setting unit configured to set a division size in the first direction and a second direction of a division area for dividing the image data, the second direction crossing the first direction, as well as a shift amount in the first direction and the second direction of the division area;
a processing unit configured to perform a predetermined process including an averaging process on the image data according to the division size and the shift amount, a quantization process for quantizing a value obtained by performing the averaging process on image data in each division area shifted in accordance with the shift amount, and an addition process for adding values obtained by the quantization process; and
an extraction unit configured to extract a unique portion from image data on which the predetermined process has been performed;
wherein the setting unit sets
(i) the division size greater in the first direction than in the second direction, and/or
(ii) the shift amount greater in the first direction than in the second direction.

7. An image processing method comprising:
an acquisition step of acquiring image data resulting from reading an image printed sequentially in a first direction;
a setting step of setting a division size in the first direction and a second direction of a division area for dividing the image data, the second direction crossing the first direction, as well as a shift amount in the first direction and the second direction of the division area;
a processing step of performing a predetermined process including an averaging process on the image data according to the division size and the shift amount, a quantization process for quantizing a value obtained by performing the averaging process on image data in each division area shifted in accordance with the shift amount, and an addition process for adding values obtained by the quantization process; and
an extraction step of extracting a unique portion from image data on which the predetermined process has been performed; wherein
the setting step sets (i) the division size greater in the first direction than in the second direction and/or (ii) the shift amount greater in the first direction than in the second direction.

8. The image processing method according to claim 7, wherein
the setting step sets multiple types of the division sizes, and
the predetermined process includes a process of further adding results of the addition process for each of the division areas corresponding to the multiple types of the division sizes.

9. The image processing method according to claim 7, wherein
the setting step sets at least one of an upper limit and a lower limit of the division size in the second direction.

* * * * *